United States Patent
Hope et al.

(10) Patent No.: US 6,257,268 B1
(45) Date of Patent: Jul. 10, 2001

(54) PRESSURE BIASED SHUTTLE VALVE

(75) Inventors: Rodney C. Hope, Sugar Land; F. Harold Hollister, Richmond, both of TX (US)

(73) Assignee: Gilmore Valve Company, Houston, TX (US)

( * ) Notice: Subject to any disclaimer, the term of this patent is extended or adjusted under 35 U.S.C. 154(b) by 0 days.

(21) Appl. No.: 09/653,415

(22) Filed: Sep. 1, 2000

Related U.S. Application Data

(63) Continuation-in-part of application No. 09/452,594, filed on Dec. 1, 1999.

(51) Int. Cl.[7] ................................................. G05D 11/02
(52) U.S. Cl. ......................... 137/112; 137/111; 137/113; 251/332; 251/333
(58) Field of Search .............................. 137/111, 112, 137/113; 251/332, 333

(56) References Cited

U.S. PATENT DOCUMENTS

| | | |
|---|---|---|
| 776,061 | 11/1904 | Hewett . |
| 1,529,384 | 3/1925 | Adams . |
| 1,686,310 | 10/1928 | Beebe . |
| 1,754,975 | 4/1930 | Andersen . |
| 1,795,386 | 3/1931 | Beebe . |
| 2,197,455 | 4/1940 | Volpin . |
| 2,318,962 | 5/1943 | Parker . |
| 2,335,814 | 12/1943 | Stevenson ............................ 277/20 |
| 2,358,228 | 9/1944 | Hoof ..................................... 251/118 |
| 2,408,799 | 10/1946 | Melichar . |
| 2,445,505 | 7/1948 | Ashton . |
| 2,551,045 | 5/1951 | Parker . |
| 2,605,080 | 7/1952 | Rea . |
| 2,634,743 | 4/1953 | Audemar . |
| 2,651,491 | 9/1953 | Ashton et al. . |
| 2,654,564 | 10/1953 | Pech . |
| 2,685,295 | 8/1954 | Tromp . |
| 2,811,979 | 11/1957 | Presnell . |
| 3,038,487 | 6/1962 | Gardner . |
| 3,454,029 | 7/1969 | Fredd ................................... 137/112 |
| 3,529,624 | 9/1970 | Cryder et al. . |
| 3,533,430 | 10/1970 | Fredd ................................... 137/112 |
| 3,533,431 | 10/1970 | Kuenzel et al. . |
| 3,550,611 | 12/1970 | Baatrup ............................... 137/111 |
| 3,815,622 | * 6/1974 | Allen ................................... 137/112 |
| 4,187,871 | * 2/1980 | Hendrickson ....................... 137/112 |
| 4,253,481 | 3/1981 | Sarlls, Jr. . |
| 4,301,825 | * 11/1981 | Simko ................................. 137/111 |
| 4,467,825 | 8/1984 | Boyd . |

* cited by examiner

Primary Examiner—John Rivell
Assistant Examiner—Ramesh Krishnamurthy
(74) Attorney, Agent, or Firm—Blackwell Sanders Peper Martin

(57) ABSTRACT

The pressure biased shuttle valve assembly in the pressure biased shuttle valve operates in conjunction with a remote operated vehicle (ROV) to actuate blow-out preventers and thus shut in the well during emergency situations. The pressure biased shuttle valve assembly opens in response to fluid pressure from the ROV. It requires little or no flow to open. These pressure biased shuttle valves are typically located subsea on a lower marine riser platform (LMRP). These platforms are sometimes brought to the surface for a periodic testing and maintenance. The pressure biased shuttle valve assembly is also used as a repair kit which facilitates easy maintenance and repair when the LMRP is brought to the surface. In one embodiment, the shuttle is rigidly connected to a piston rod. In another embodiment, there is a flexible connection between the piston rod and shuttle. The purpose of the flexible connection is to encourage a better seal in smaller size valves.

24 Claims, 12 Drawing Sheets

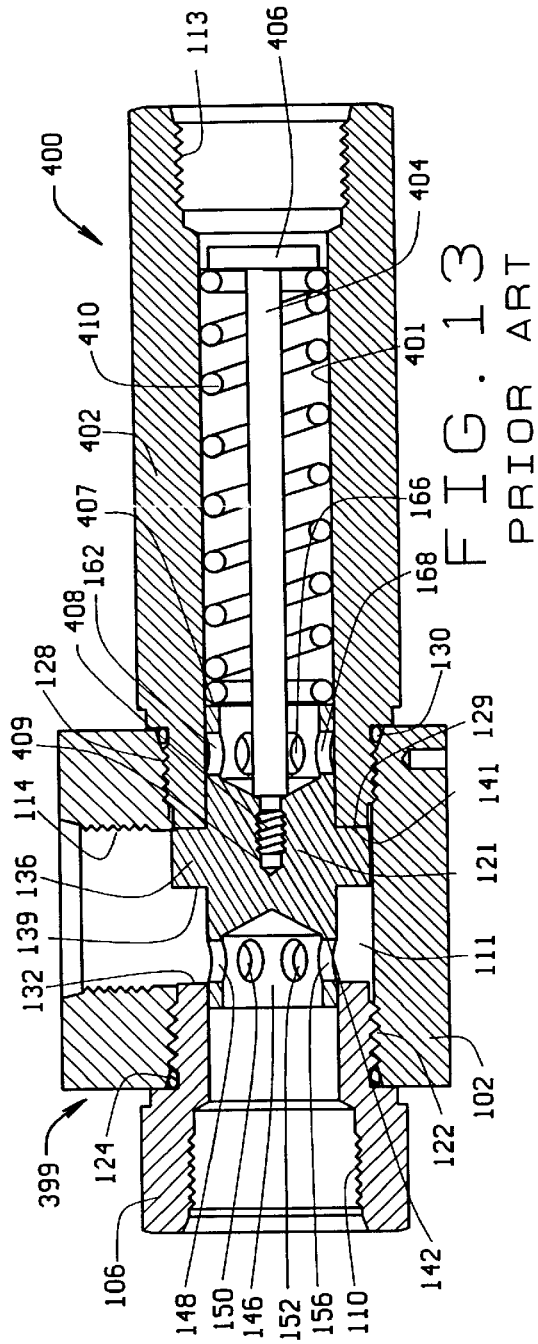
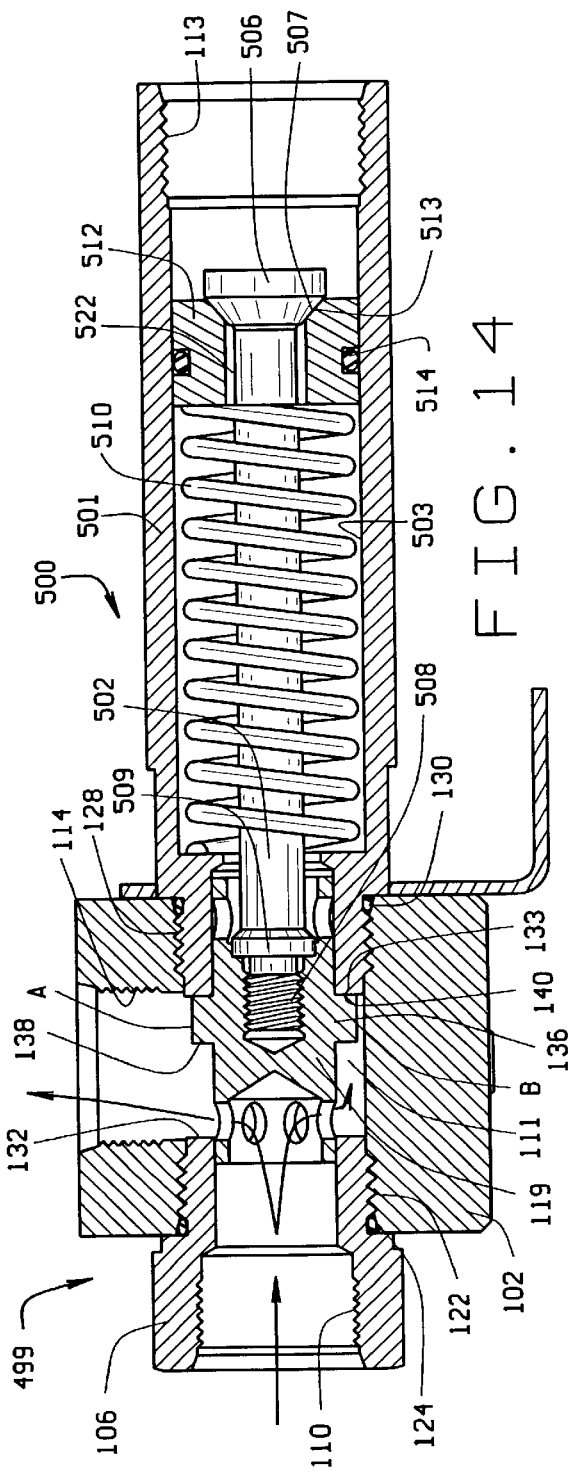

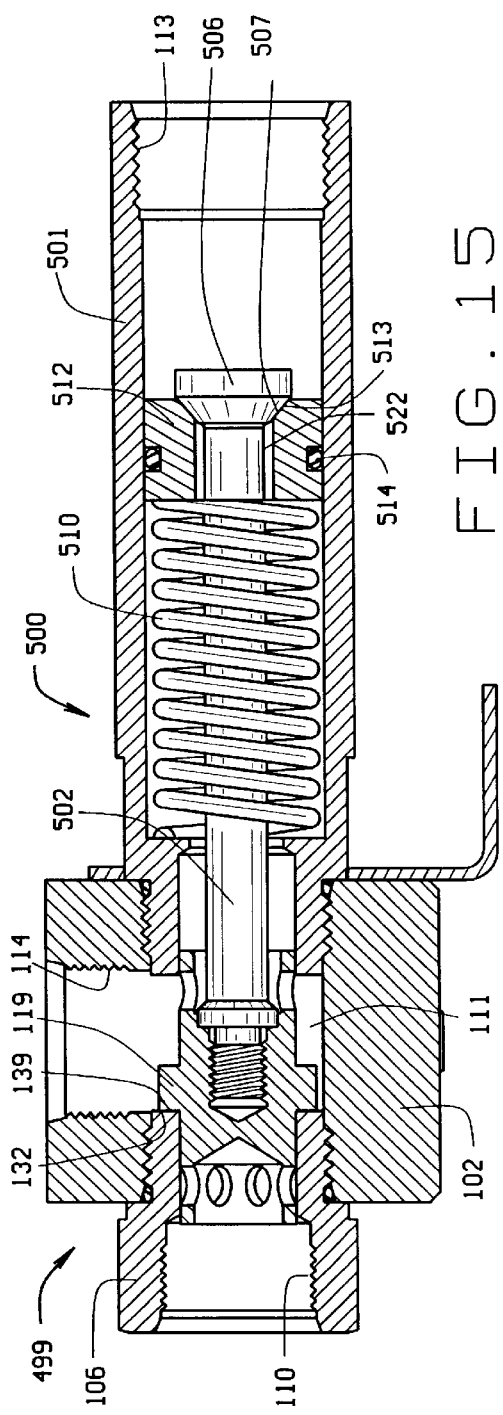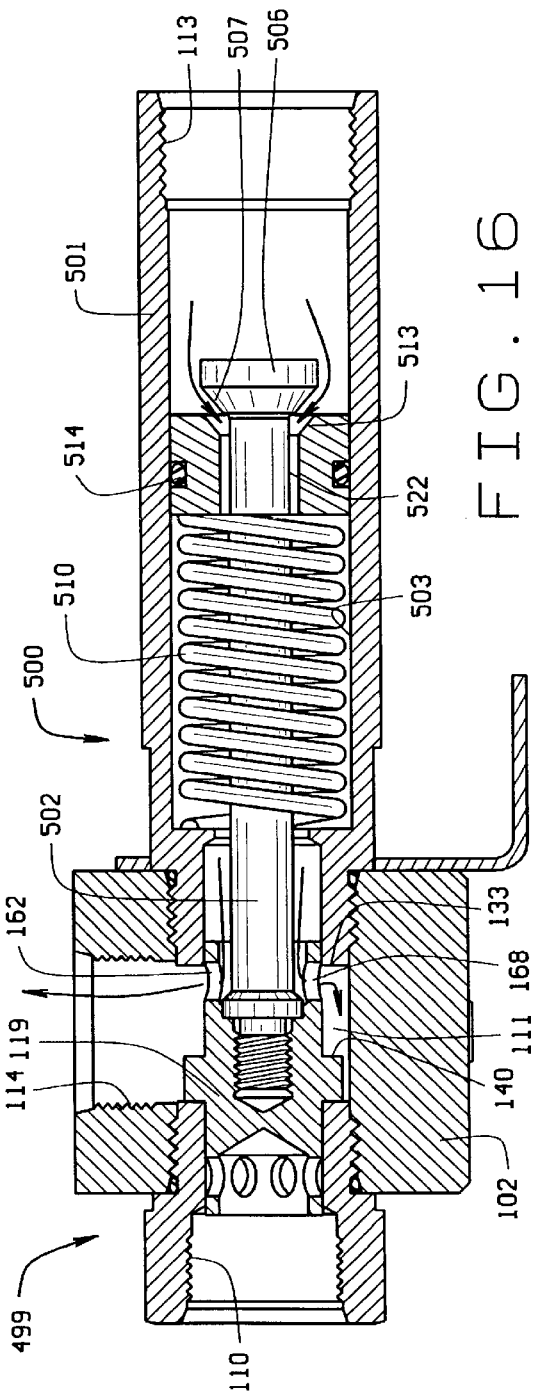

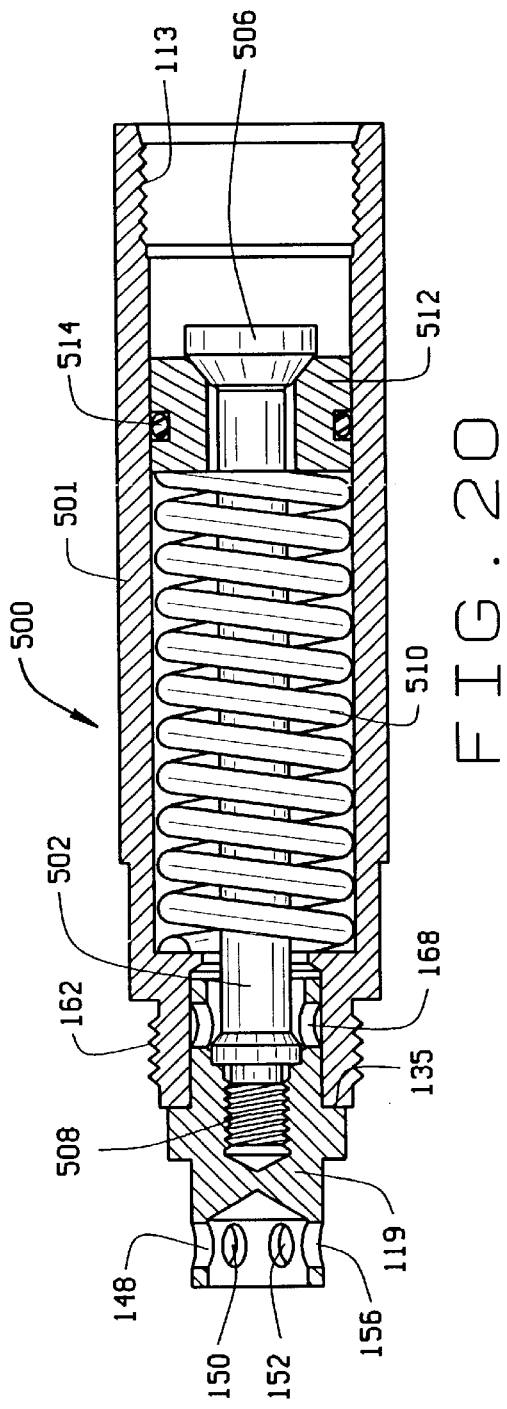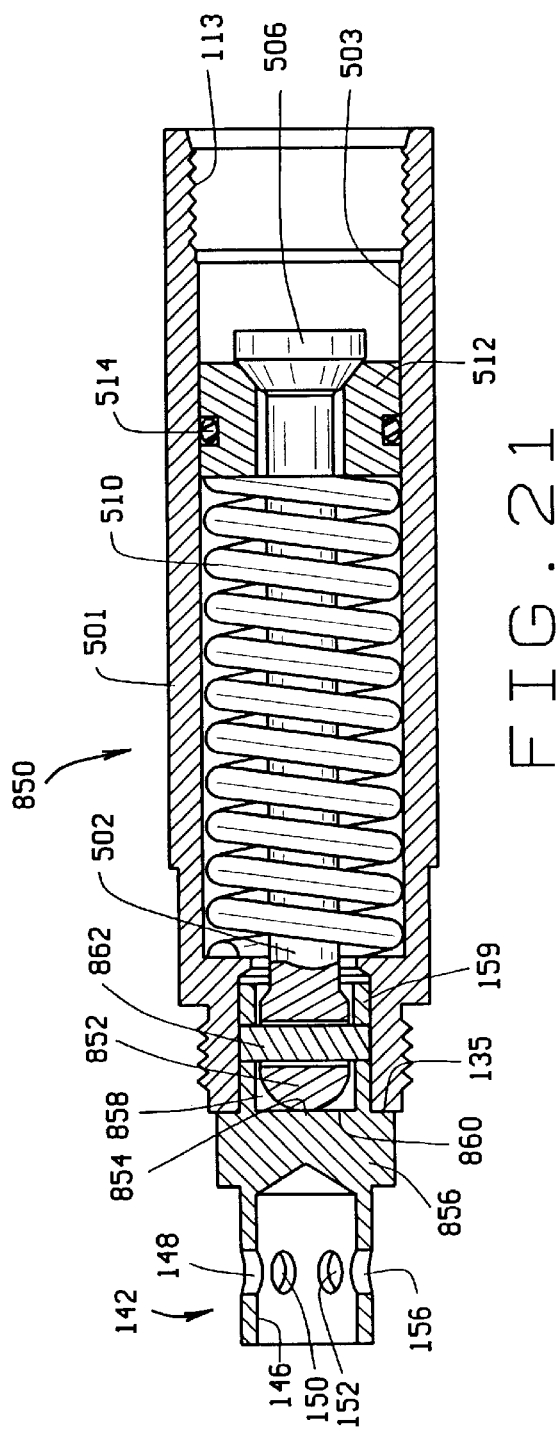

PRESSURE BIASED SHUTTLE VALVE

CROSS-REFERENCES TO RELATED APPLICATIONS

This is a continuation-in-part of U.S. patent application Ser. No. 09/452,594, for a Low Interflow Hydraulic Shuttle Valve, filed on Dec. 1, 1999, which is assigned to Gilmore Valve Company.

BACKGROUND OF THE INVENTION

A. Field of the Invention

This invention relates to valves, and more particularly to shuttle valves. The invention is an improvement upon shuttle valves of the type made and sold by applicant's assignee, Gilmore Valve Company, which is the owner of the other U.S. patents for improved shuttle valves including U.S. Pat. Nos. 3,533,431 and 4,253,481.

B. Description of the Prior Art

Shuttle valves have been used for many years to control the flow of gases as in U.S. Pat. Nos. 1,529,384 and 2,408,799. Other shuttle valves have been used to control the flow of liquids as in U.S. Pat. Nos. 1,686,310 and 1,795,386.

Shuttle valves used to control hydraulic fluid, particularly those used in underwater oil field equipment, must be designed taking into consideration working pressures, up to several thousand psi and flow rates of up to several hundred gpm. It is especially important that underwater shuttle valves used in connection with operation of subsea blowout preventers (BOPs) have a long trouble-free life because of their inaccessibility. The differential pressure on the shuttle often results in high momentum as it moves from one valve seat to another. When a shuttle contacts a valve seat, the repeated impact can break or crack the cage or cause it to be warped, and can otherwise disrupt proper valve operation.

One way to address the problem of shuttle impact is to lighten the shuttle and provide rubber cushions in the form of thick sealing elements as shown in U.S. Pat. No. 3,038,487. Yet another way of addressing shuttle impact is a hydraulic cushion as shown in U.S. Pat. No. 4,253,481 owned by applicant's assignee. The hydraulic cushion discussed above is similar to the action of a hydraulic cushioned slush pump valve as shown in U.S. Pat. Nos. 2,197,455 and 2,605,080. U.S. Pat. No. 2,654,564 discloses a metal to metal seat to take the axial load imposed on the shuttle and thereby to limit the pressure on the rubber seal ring so that the rubber is prevented from being overloaded, cut or extruded by the action of high pressure fluid.

The shuttle valve disclosed in U.S. Pat. No. 4,253,481 was sold for many years by Gilmore Valve Company for use with underwater oil field equipment. This prior art valve shuttle valve was limited to two inputs and was relatively expensive to manufacture. To overcome some of these limitations, Gilmore introduced the Mark I shuttle valve in 1997 as shown in FIG. 1 of the drawings. The Mark I relied upon two elastomeric o-rings mounted around the central flange of the shuttle to achieve a seal. The end portions of the shuttle were relatively thin and were prone to cracking because of shuttle impact. In addition, the o-rings were sometimes cut or blown off due to operational pressures and flow rates.

In order to overcome some of the limitations of the Mark I, Gilmore developed a retrofit design known as the Mark II which was introduced in 1998 as shown in FIG. 2 of the drawings. The Mark II design included an increased thickness of the end portions or cage, a decrease in hole size, larger o-rings which were stretched around the shuttle and a pair of plastic teflon bearings to center the shuttle and reduce vibration as it traveled back and forth. The Mark II eliminated many of the problems of the Mark I; however, at the highest operational flow rates, o-rings were still lost. The present invention is designed for operation at 5,000 psi; the ½ inch model is designed for an 80 gpm flow rate, the 1 inch model is designed for a 250 gpm flow rate and the 1½ inch model, is designed for a 350 gpm flow rate.

In an effort to overcome the limitations of the Mark I and Mark II, applicant has developed an improved design which is the subject of the present invention. In order to overcome some of the problems associated with elastomeric seals, the present invention has eliminated such seals and now relies upon a metal to metal seal. The metal to metal seal of the present invention is progressively coined because of repeated contact between opposing tapered sealing surfaces surrounding a central flange on the shuttle and opposing metal valve seats.

The present invention includes alternative embodiments having a modular design that allows the components to be stacked one upon the other to receive more than two inputs. Another stackable, multi-input valve is disclosed in U.S. Pat. No. 4,467,825. This design uses a plurality of spool valve members to direct a superior fluid input signal to the outlet.

The present invention is less expensive to manufacture than prior shuttle valves sold by Gilmore Valve Company as disclosed in U.S. Pat. No. 4,253,481. Alternative embodiments of the present invention allow the shuttle valve to receive 3 or more inputs which was not possible with the shuttle valve disclosed in U.S. Pat. No. 4,253,481. In addition, the present invention overcomes the limitations of the Mark I and Mark II discussed above.

In emergency situations or during testing, it may be necessary to close the subsea BOPs using a remote operated vehicle (ROV). The ROV is an unmanned submarine with an on-board television camera so the ROV can be maneuvered by topside personnel on board a ship. The ROV is equipped with a plug that stabs into a receptacle on the ROV docking station on the lower marine riser platform (LMRP). The LMRP sets on top of the BOPs. A hose runs from the receptacle on the ROV docketing station to a biased shuttle valve.

In an emergency or during testing, the ROV is maneuvered to stab into the receptacle on the ROV docking station. The ROV injects hydraulic fluid at relatively high pressures (greater than 1,000 psi) and relatively low flow rates into the hose to the biased shuttle valve to close the BOPs. Gilmore Valve Company has sold a flow biased shuttle valve to work with the ROV, but it has operational limitations. This prior art flow biased shuttle valve was flow activated and it needed the following minimum flow rates to activate: one-half inch model, 5 GPM; 1-inch model 20 GPM and one and one-half inch model 50 GPM. Some ROVs on the market may not be able to produce sufficient flow rates in the larger sizes to activate the prior art Gilmore flow biased shuttle valve.

In order to address this need, a pressure biased shuttle valve was developed that operates on pressure, not flow. The pressure biased shuttle valve of the present invention needs a minimum operating pressure of 1000 psi and little or no flow. Most, if not all ROVs currently on the market, can produce operational pressures well in excess of 1,000 psi, and thus can operate the pressure biased shuttle valve of the present invention. The pressure biased shuttle valve uses the coining technique to achieve a metal to metal seal.

Some prior art shuttle valves had problems with switchback. This phenomena occurs only on return flow and is the result of fluid momentum shifting the shuttle after closing pressure is relieved and prior to opening pressure being applied. This results in an indefinite flow path for return flow. Most return flow paths in the closing circuit exhaust to the ocean, so usually this does not create an operating problem. The exception to this is when one of the possible return paths is an ROV port. Such ports are commonly plugged to prevent saltwater ingress into the system. If the return flow becomes inadvertently switched to a plugged ROV port, it will substantially increase the opening time of the BOP. The present invention was developed to reduce switchback. The present invention employs a spring which biases the return flow to the non-biased port. The biased port is energized by pressure, permitting operation with low volume pumps employed on ROV's. In addition, the spring is preloaded so that saltwater may exceed the ambient hydraulic system pressure by up to 100 psi without leakage of salt water into the hydraulic system.

SUMMARY OF THE INVENTION

The preferred embodiment of the present invention includes two coaxial inlets or supply ports and a single transverse outlet or function port. A metal valve seat surrounds each of the coaxial opposing supply ports. An elongate shuttle is coaxial with the metal valve seats and the supply ports. The shuttle valve moves from one valve seat to the other in response to differential fluid pressure. The shuttle includes a central circumferential flange with opposing tapered sealing surfaces that alternatively engage the metal valve seats around the supply ports. Each metal valve seat has a chamfer which forms an obtuse metal point. As the shuttle moves back and forth into alternative engagement with the metal valve seats, the opposing tapered sealing surfaces strike the obtuse points and displaces a portion of the metal into each respective chamfer. This displacement occurs repeatedly as the shuttle strikes the obtuse points. This displacement of metal from the obtuse point into the chamfer insures a good metal to metal seal between the valve seats and the tapered sealing surfaces on the flange of the shuttle. This phenomena is also known as "progressive coining."

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and are therefore not to be considered limiting of its scope, for the invention may admit to other equally effective embodiments. Reference the appending drawings, wherein:

FIG. 13 is a section view of a prior art flow biased shuttle valve sold by Gilmore Valve Company.

FIG. 14 is a section view of the pressure biased shuttle valve of the present invention in the closed position.

FIG. 15 is a section view of the pressure biased shuttle valve of FIG. 14 in an intermediate position.

FIG. 16 is a section view of the pressure biased shuttle valve in the open position.

FIG. 20 is a section view of the pressure biased shuttle assembly which is sold as a repair kit for the pressure biased shuttle valve shown in FIGS. 14–19.

FIG. 21 is a section view of an alternative embodiment of the pressure biased shuttle assembly. It can be sold as an alternative to the repair kit of FIG. 20. It can likewise be used in the pressure biased shuttle valve of FIGS. 14–19.

DESCRIPTION OF THE PREFERRED EMBODIMENT

Subsea wellheads are often relied upon during deep water exploration for oil and natural gas. The subsea wellheads includes a stack of BOPs. Annular BOPs are actuated on a routine basis to snub or otherwise control pressure during normal drilling operations. Other blow-out preventers, such as blind rams, pipe rams, kelly rams and shear rams will also be included in the stack on the subsea wellhead. When these types of rams are actuated, operations in the well cease in order to control pressure or some other anomaly. Blind rams, pipe rams, kelly rams and shear rams are periodically tested to make sure that they are operational.

The control pod is a capsule attached to the LMRP which extends from the subsea wellhead. The accumulators (tanks with air space in the tops) are mounted on the LMRP. At least one shuttle valve of the present invention may be attached to each BOP on the subsea wellhead. Fluid flows from the accumulators through valves on the control pod through the shuttle valve of the present invention, to activate the BOPs.

Figure 1:
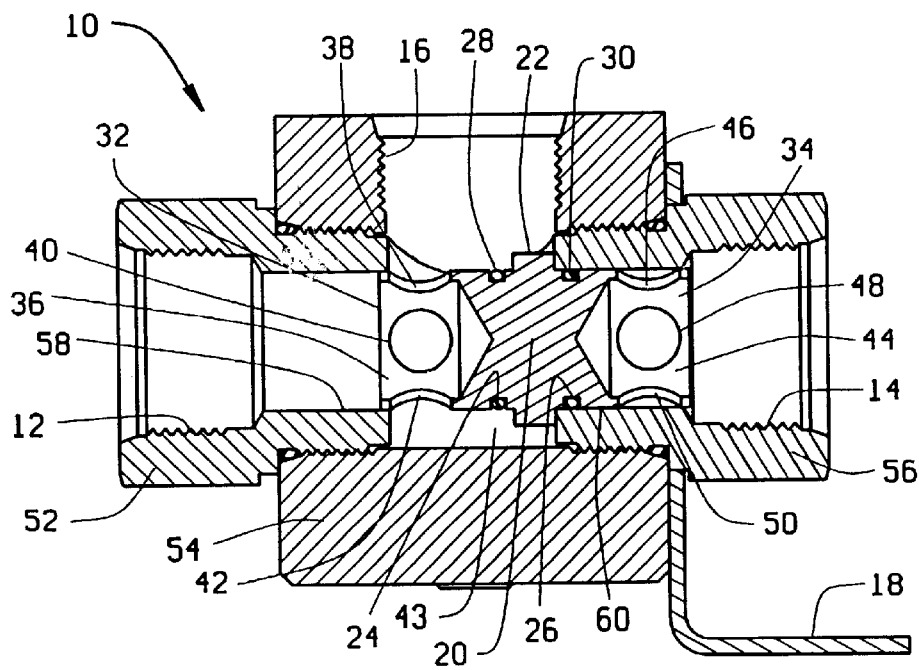
FIG. 1 is a section view of the Mark I shuttle valve, a prior art design, sold by Gilmore Valve Company.

FIG. 1 is a section view of the Mark I shuttle valve, a prior art design sold by Gilmore Valve Company. The shuttle valve 10, has a first inlet or supply port 12, a coaxial second inlet or supply port 14 and a transverse outlet or function port 16. The supply ports 12 and 14 are in fluid communication with the accumulators and the function port 16 is in fluid communication with the BOP on the subsea wellhead. The shuttle valve 10 mounts via a bracket 18 to a BOP. The shuttle 20 includes a central circumferential flange 22 which is located between a first o-ring groove 24 and a second o-ring groove 26. A first o-ring 28 is positioned in the first o-ring groove 24. A second o-ring 30 is positioned in the second o-ring groove 26.

The shuttle 20 has elongate end portions or cages 32 and 34. The first end portion 32 includes a central bore 36 which is perforated by apertures 38, 40, 42 and fourth aperture not shown in the drawing. These apertures allow fluid to flow from the first supply port 12 through the bore 36, through the apertures 38, 40 and 42 through a passageway 43 in the body 54 and out through the function port 16. The other end portion or cage 34 has a bore 44 and apertures 46, 48, 50 and a fourth aperture not shown.

The first supply port 12 is formed by an adapter 52 which threadably engages the body 54. The second supply port 14 is formed by an adapter 56 which also threadably engages the body 54. The first supply port 12 and the second supply port 14 are located on opposite sides of the body 54 and are coaxial. The adapter 52 further defines a tubular valve seat 58 which engages and seals with the o-ring 28 on the shuttle 20. The other adapter 56 likewise defines a tubular valve seat 60 which engages and seals with the o-ring 30 as shown in this figure. During operation of this prior art shuttle valve, o-rings were sometimes cut or lost and the end portions, or cages were cracked due to shuttle impact.

Figure 2:
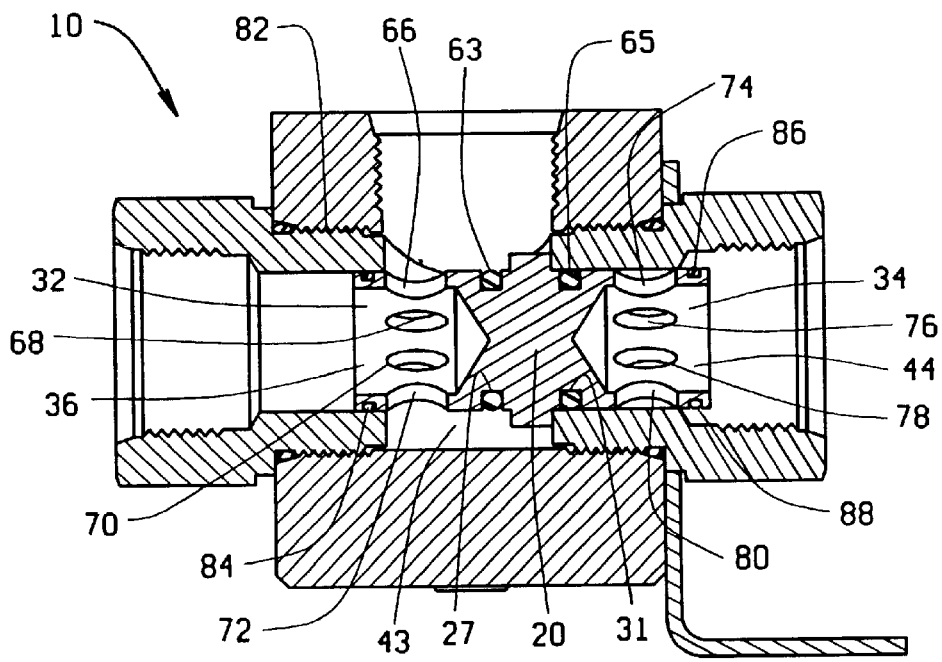
FIG. 2 is a section view of the Mark II shuttle valve, a prior art design, sold by Gilmore Valve Company.

FIG. 2 is a section view of the Mark II shuttle valve, a prior art design sold by Gilmore Valve Company. The Mark II was developed as a retrofit design to overcome some of the limitations in the Mark I. In this embodiment, the shuttle 20 was redesigned with deeper o-ring grooves 27 and 31 and larger o-rings 63 and 65. In addition, the diameter of the bores 36 and 44 was diminished, thereby thickening the wall of the end portions or cages 32 and 34. The diameter of the holes was decreased thus necessitating more holes to accommodate the same volume of fluid flow. End portion 32 was redesigned with six holes 66, 68, 70, 72 and two other holes not shown in the drawing. Likewise, end portion or cage 34 was redesigned with six holes 74, 76, 78, 80 and two other holes not shown. (The Mark I only had four holes.) In order to reduce valve impact and vibration, a circumferential channel 82 was formed in end portion 32 to receive a plastic teflon bearing 84. Likewise, a circumferential channel 86 was formed around end portion 34 to receive another plastic teflon bearing 88. These improvements in the design overcame many of the limitations of the prior art shown in FIG. 1; however, at the highest flow rates, o-rings were still being lost. Further improvements were needed.

Figure 3:
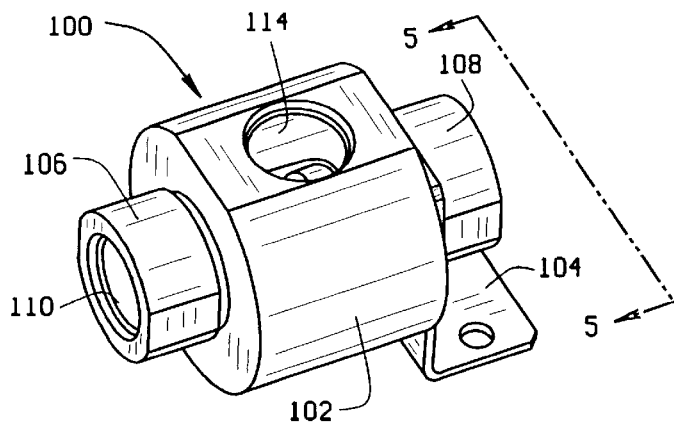
FIG. 3 is a perspective view of the low interflow hydraulic shuttle valve of the present invention with two supply ports.

FIG. 3 is a perspective view of the present invention, which is a low interflow hydraulic shuttle valve, generally identified by the numeral 100. The shuttle valve 100 includes a body 102 which is supported by a bracket 104. The valve 100 includes a first adapter 106 and a second adapter 108 coaxially aligned on opposite sides of the body 102. The first adapter 106 forms an inlet or supply port 110 and the second adapter 108 forms a second inlet or supply port 112. Each supply port 110 and 112 is connected to a separate hose or piping, not shown in the drawings. The body 102 forms a transverse outlet or function port 114. The function port 114 is connected to a hose or piping, not shown, in the drawing. Fluid enters the valve 100 either through the first supply port 110 or the second supply port 112 and exits the valve 100 through the function port 114.

Figure 4:
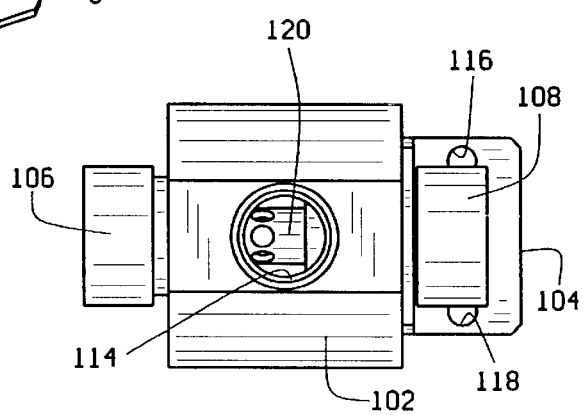
FIG. 4 is a top view of the shuttle valve shown in FIG. 3.

FIG. 4 is a top view of the valve 100 of FIG. 3. The bracket 104 includes a first aperture 116 and a second aperture 118 for mounting purposes. Looking down into the function port 114, the shuttle 120 is shown in a right-hand position shutting off any fluid flow from the second function port 112.

Figure 5:
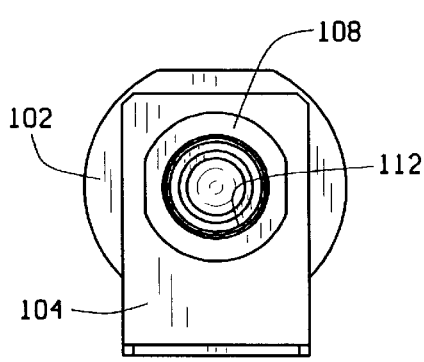
FIG. 5 is an end view of the shuttle valve of FIG. 3 along the line 5—5.

FIG. 5 is an in view of the valve 100 and the bracket 104 along the line 5—5 of FIG. 3. The second supply port 112 is formed by the second adapter 108.

Figure 6:
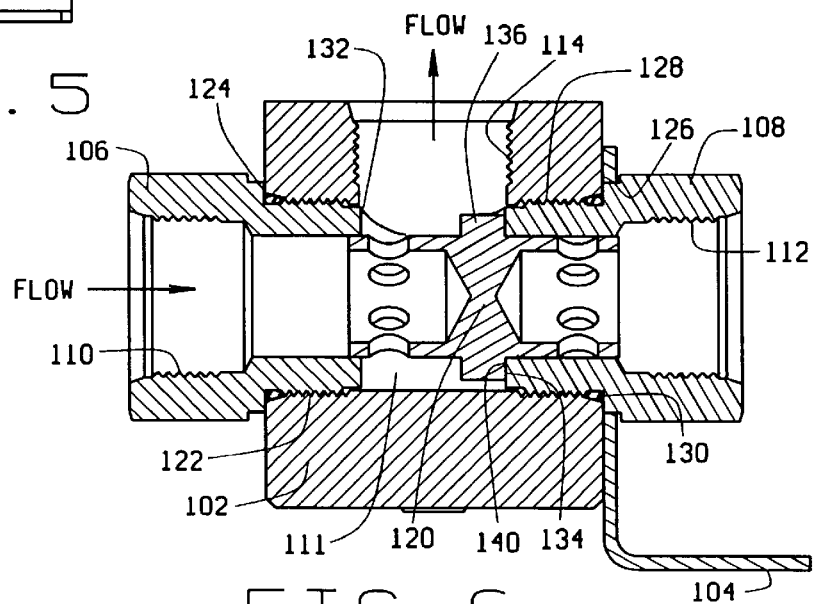
FIG. 6 is a section view of the shuttle valve of FIG. 3 with the shuttle in engagement with the valve seat of the second supply port allowing fluid flow from the first supply port to the function port.

FIG. 6 is a section view of the present invention with the shuttle 120 in the right hand position sealing off fluid flow from the second supply port 112. In this view, fluid can flow from the first supply port 110 through a passageway 111 in the body 102 and out the function port 114 as shown by the flow arrows in the drawing. The first adapter 106 threadably engages an aperture 122 in the body 102. An o-ring 124 seals the adapter 106 to the body 102. The second adapter 108 includes a recess 126 to engage the bracket 104. The second adapter 108 threadably engages an aperture 128 in the body 102. An o-ring 130 seals the adapter 108 to the body 102. The adapter 106 includes a metal valve seat 132 and the second adapter 108 includes an opposing coaxial metal valve seat 134. The shuttle 120 includes a centrally located circumferential flange 136 which has opposing tapered sealing surfaces 138 and 140. As shown in this drawing, sealing surface 140 is in sealing engagement with the metal valve seat 134 blocking any fluid flow from the second supply port 112.

The shuttle 120 may be produced from a variety of materials as a matter of manufacturing choice including, but not limited to, Nitronic 60 (ASTMA-276 TP S21800) or 17-4PH Stainless Steel. The material should have good wear characteristics. In the case of the aforementioned stainless steel, the shuttle 120 may be nitrided by Houston Unlimited, Inc. of Houston, Tex. Other hardening processes, such as conventional heat treating may also be suitable depending on the application. Nitriding, like heat treating, is widely available from other vendors on a national basis. It is not necessary to nitride a shuttle 120 produced from Nitronic 60.

Figure 7:
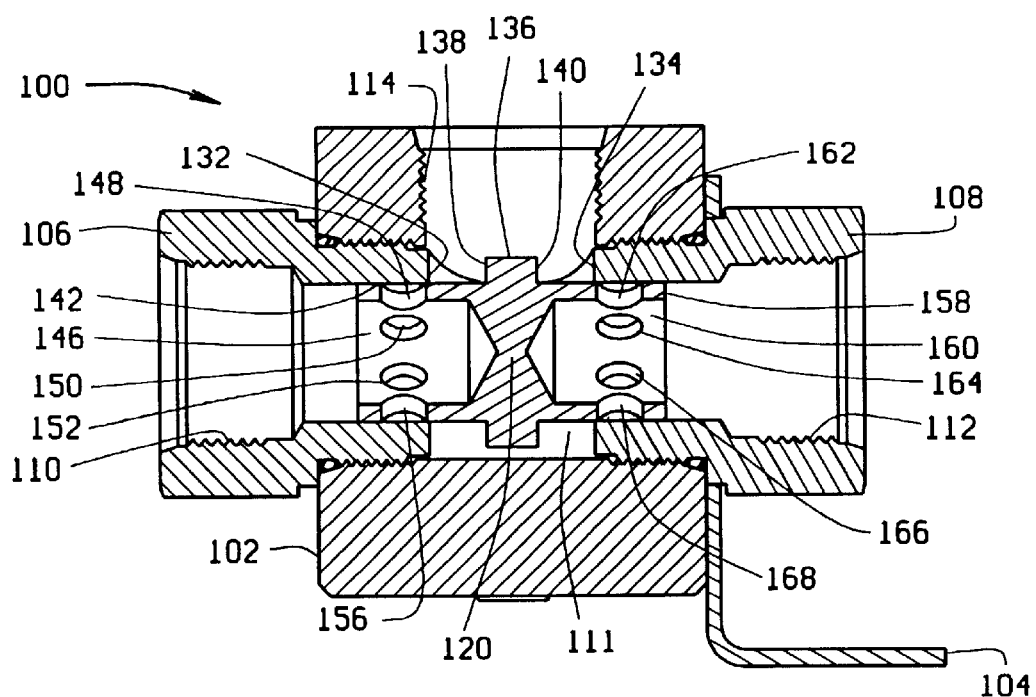
FIG. 7 is a section view of the shuttle valve of FIG. 6, except the shuttle has moved to the mid-point of travel, which is a low or no flow position.
Figure 8:
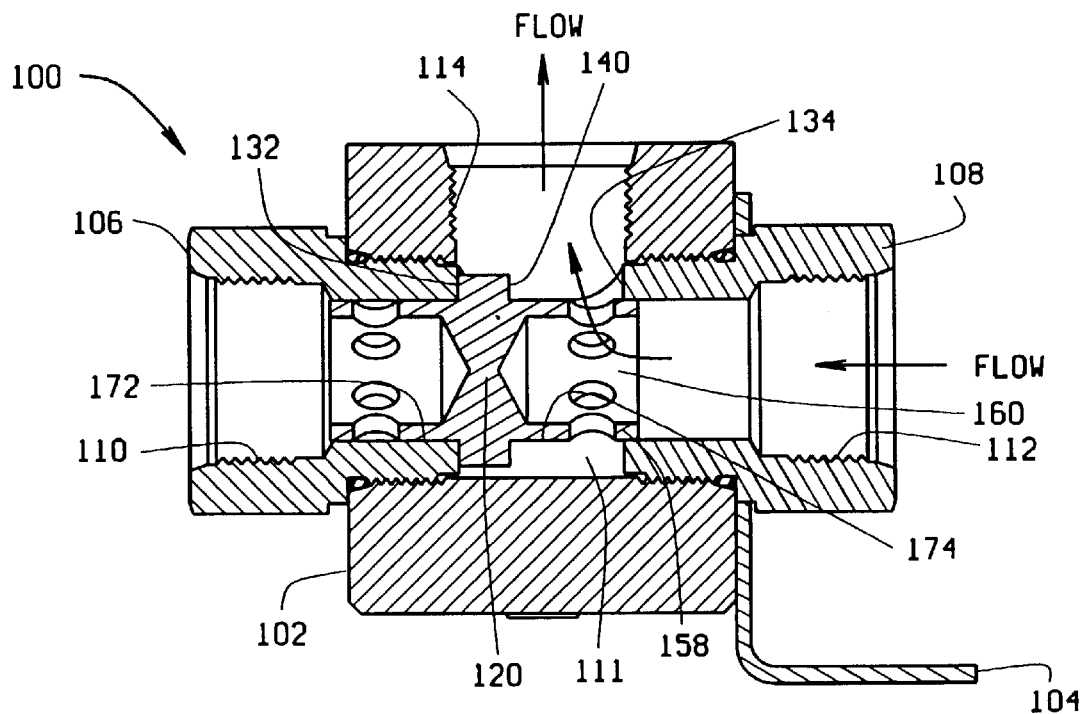
FIG. 8 is a section view of the shuttle valve of FIG. 6, except the shuttle has moved into engagement with the valve seat of the first supply port allowing fluid flow from the second supply port to the function port.

FIGS. 6, 7 and 8 show a section view of the preferred embodiment of the present invention with the shuttle 120 in three different operational positions. In FIG. 6, the shuttle 120 is shown in the right hand position in sealing engagement with the metal valve seat 134 of second supply port 112. This allows fluid to flow from the first supply port 110 through the bore 146 and apertures 148, 150, 152 and 156 through the passageway 111 of valve 100 to the function port 114. In FIG. 7 the shuttle 120 has disengaged with the valve seat 134 of the second supply port 112 and is shown at the mid point of its travel where there is little or no interflow from the first supply port 110 or the second supply port 112 into the passageway 111 or the function port 114. In FIG. 8 the shuttle 120 has moved into the left hand position in sealing engagement with the valve seat 132 of the first supply port 110. As shown by the flow arrows in FIG. 8, fluid can now pass through the second supply port 112 through the passageway 111 of valve 100 and out the function port 114 as indicated by the flow arrows in the drawing.

FIG. 7 is a section view of the shuttle valve 100 with the shuttle 120 at its mid point of travel between valve seat 134 and valve seat 132. The shuttle 120 has a first end portion or cage 142 that includes a central bore 146 and a total of six apertures 148, 150, 152, 156 and two others not shown. The other end portion or cage 158 includes a bore 160 that is coaxial with the bore 146 and a total of six apertures 162, 164, 166, 168 and two others not shown.

FIG. 8 is a section view of the shuttle valve 100 with the shuttle 120 in sealing engagement with the metal seat 132 so that fluid can not flow from the first supply port 110 to the function port 114. In FIG. 8, fluid flows from the second supply port 112 through the central bore 160 of the end portion or cage 158 through the apertures 162, 164, 166 and 168 into a central passageway 111 in the body 102 and out the shuffle valve 100 through the function port 114 as shown by the flow arrows in the drawing.

Due to differential pressure, the shuttle 120 will travel from the right hand position as shown in FIG. 6 to the mid-point position shown in FIG. 7 to the left hand position shown in FIG. 8. This movement of the shuttle 120 from right hand position to the left hand position, occurs quickly and creates impact forces on the shuttle 120 and the valve seats 132 and 134. Cracking of the end portions or cages was one of the problems in the prior art design shown in FIG. 1. The cracking problem has been overcome through the use of holes with a smaller diameter thus allowing more structural metal in the cage between the holes and a smaller diameter bore 146 and 160 thus allowing a thicker cage wall 172 and 174 when contrasted with the prior art design of FIG. 1. These dimensions vary with each size valve. Applicant has found that a six hole design with. holes having a diameter of 0.328 inches and a cage wall thickness of 0.113 inches works well for a 1 inch valve. However, a shuttle with a different number or size of holes and a different cage wall thickness is within the scope of this invention provided that it does not result in cracks due to valve impact or otherwise damage the valve 100.

Figure 9:
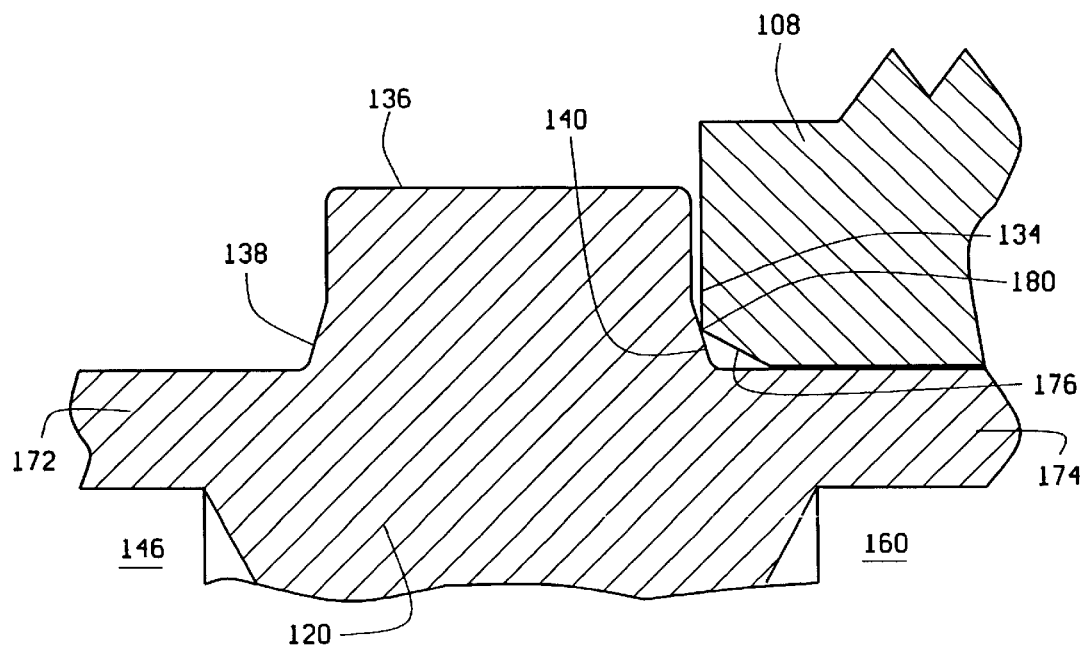
FIG. 9 is an enlarged view of a portion of the metal valve seat and a portion of the shuttle before any coining has occurred.
Figure 10:
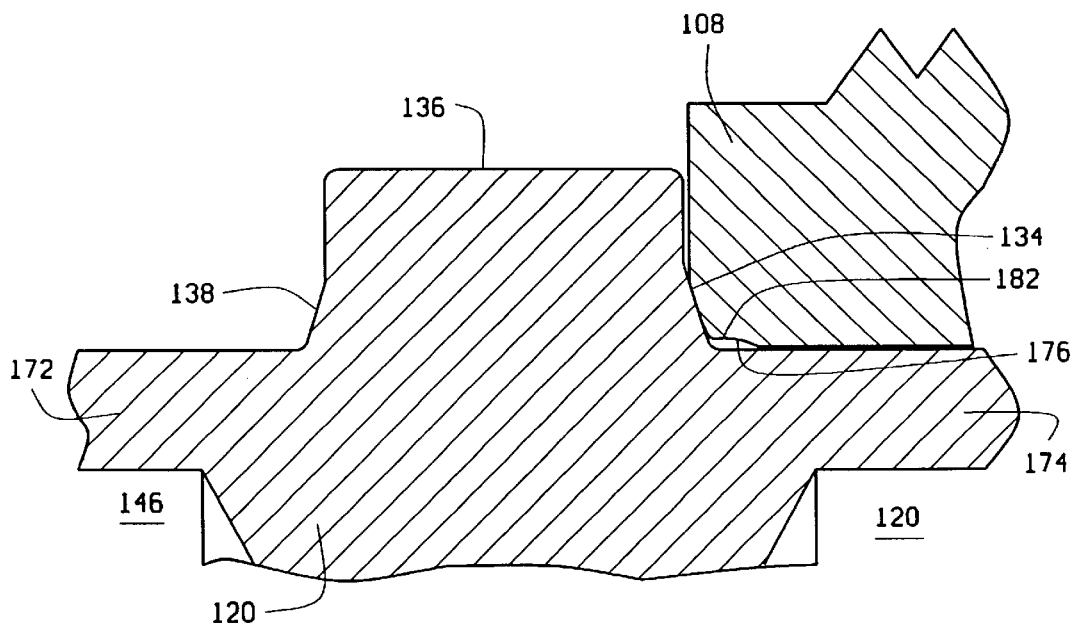
FIG. 10 is an enlarged view of a portion of the metal valve seat and a portion of the shuttle after coining has occurred and sealing engagement has been established.

FIG. 9 is an enlarged section view of a portion of the shuttle 120 and a portion of the adapter 108. FIG. 9 shows the sealing surfaces after the valve 100 has been manufactured but before any coining has occurred. FIG. 10 shows the sealing surfaces after coining has occurred. In FIG. 9 the shuttle 120 includes a circumferential external flange 136 with opposing outwardly tapered metal sealing surfaces 138 and 140. Applicant believes that a taper of approximately 8 degrees is optimum for this application. However, other tapers are within the scope of this invention so long as they will create a coining effect on the metal valve seats 132 and 134 of the adapters 106 and 108. Other tapers may be suitable for other applications possibly in the range of 5 to 15 degrees. The only requirement for the angle of taper is to achieve coining and therefore sealing with the metal valve seats 132 and 134.

The adapter 108 includes a chamfer 176 recessed behind the metal valve seat 134 to thereby create an obtuse metal point 180 that will contact the tapered metal sealing surface 140 on the flange 136 of the shuttle 120. FIG. 9 shows the metal valve seat 134 and the metal sealing surface 140 on the shuttle 120 before any coining has occurred. Applicant uses a chamfer with a 15 degree angle and a 0.015" radius. However, the exact size and depth of the chamfer are not particularly critical because this is merely a recess or space into which displaced metal will move due to progressive coining. A stepped back shoulder or other recess would be sufficient to achieve the goals of this invention, provided that there is room to receive the displaced metal from the point 180 such that it does not interfere with movement of the shuttle 120. When adapter 106 is first manufactured it likewise has a chamfer 177 recessed behind the metal valve seat 132 to thereby create an obtuse metal point 181 that will contact the tapered metal sealing surface 138 on the flange 136 of the shuttle 120. The point 181 is progressively coined in the same fashion as the point 180 by the impact of the shuttle 120.

FIG. 10 is an enlarged section view of a portion of the shuttle 120 and a portion of the second adapter 108 after coining has occurred. As the tapered metal sealing surface 140 of the shuttle 120 impacts the point 180 of the metal valve seat 134, a portion of the metal in the point 180 is displaced into the chamfer 176. This displaced metal is identified by the numeral 182. A metal to metal seal is therefore achieved between the metal valve seat 134 and the outwardly tapered metal sealing surface 140 of the flange 136 on the shuttle 120.

Likewise, the outwardly tapered metal sealing surface 138 will impact point 181 on the metal valve seat 132 and will displace a portion of the metal into the chamfer, thus creating a metal to metal seal between the metal valve seat 132 and the outwardly tapered sealing surface 138 on the flange 136 of shuttle 120.

Figure 11:
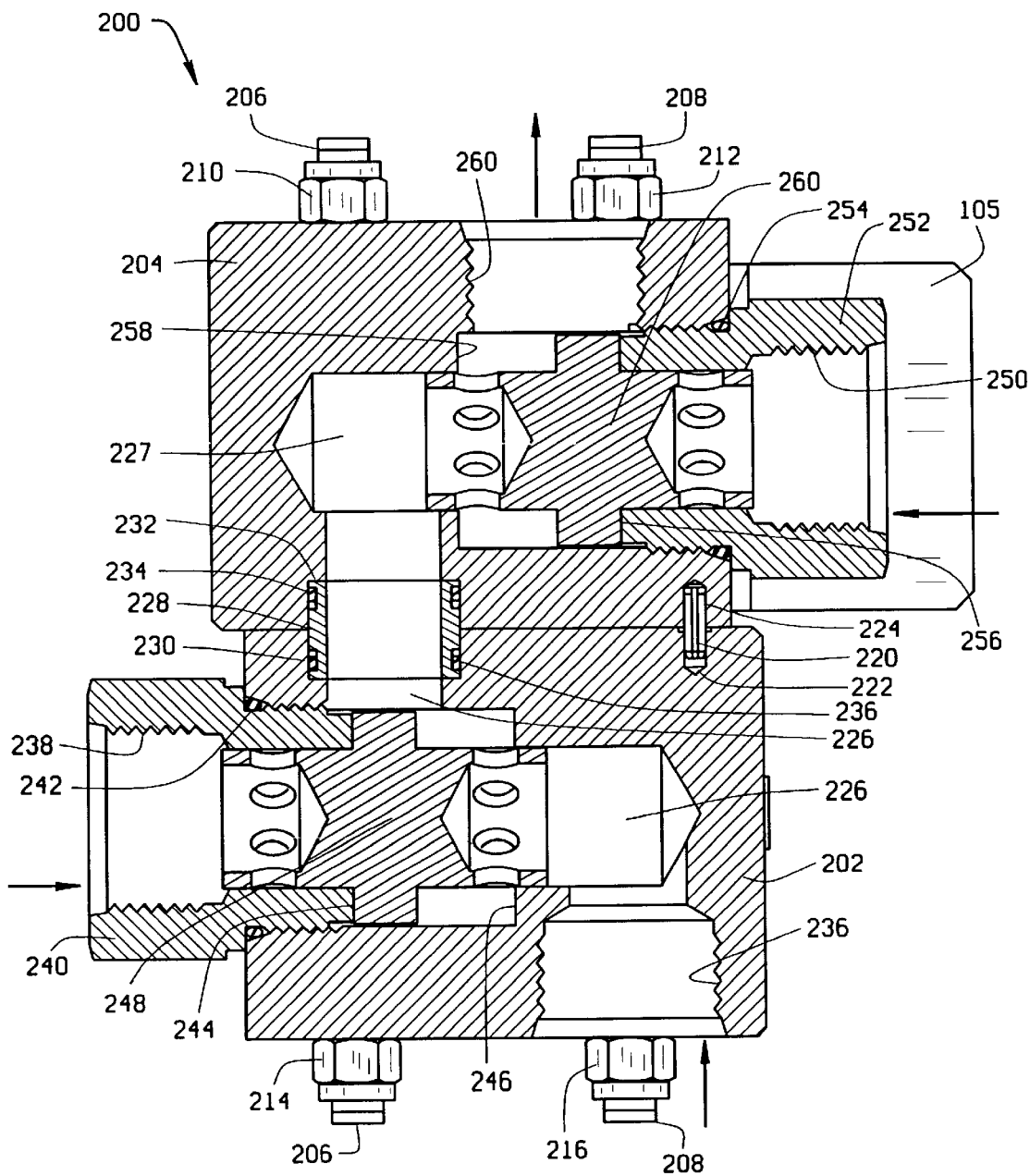
FIG. 11 is a section view of an alternative embodiment of the present invention with three supply ports.

FIG. 11 is a section view of an alternative embodiment of a low interflow hydraulic shuttle valve with three supply ports. (The embodiment in FIG. 3 has two supply ports.) The shuttle valve 200 includes a first body portion 202 and a second body portion 204 that are held together by a plurality of bolts 206 and 208 and a plurality of nuts 210, 212, 214 and 216 that mechanically grip the two body sections 202 and 204 thus joining them together into an integral assembly. An alignment pin 220 fits into a bore 222 of the body 202 and a coaxial bore 224 of the body 204. A zig-zagged interconnecting passageway 226 is formed in the body 202 and is in fluid communication with a second zig-zag passageway 227 in the body 204. A connector 228 is positioned in a bore 230 of the body 202 and another coaxial bore 232 in the body 226. The connector 228 has a first seal 234 and a second seal 236 to prevent fluid from leaking from the zig-zagged passageways 226 and 227. The connector 228 also helps align the body portions 202 and 204.

A first supply port 236 is formed in the body 202 and is in fluid communication with the passageway 226. A second supply port 238 is formed in a first adapter 240. The adapter 240 threadably engages the body 202. The adapter 240 is sealed against the body 202 by an o-ring 242. A metal valve seat 244 is formed on one end of the adapter 240. A second metal valve seat 246 is formed in the body 202 and is coaxial with valve seat 244. A shuttle 250 moves from sealing engagement with the metal valve seat 244 of the adapter 240 to alternative sealing engagement with the valve seat 246 of the body 202.

A third supply port 250 is formed in another adapter 252. The adapter 252 threadably engages the body 204 and is sealed by an o-ring 254. A mounting bracket 105 is positioned between the body 204 and the adapter 252. The adapter 252 includes a metal valve seat 256. An opposing metal valve seat 258 is formed in the body 204 and is coaxial with valve seat 244. A shuttle 260 travels back and forth into alternative sealing engagement with the metal valve seat 256 and the metal valve seat 258 depending on differential fluid pressure in the third supply port 250 and the passageway 227. A function port 260 is formed in the body 204 and connects to the BOP, not shown.

A first supply line, not shown in the drawing, connects to the first supply port 236, a second supply line, not shown in the drawing, connects to the second supply port 238 and a third supply line, not shown in the drawing, connects to the third supply port 250. If the pressure into the first supply port 236 is greater than the fluid pressure in the second supply port 238 or the third supply port 250, the shuttle 248 and the shuttle 260 will be urged into sealing engagement with the metal valve seats 244 and 256 as shown in FIG. 11. This allows fluid to flow from the first supply port 236 through the zig-zagged passageways 226 and 227 and out the function port 260 to the BOP, not shown.

If fluid pressure in the second supply port 238 is greater than fluid pressure in the first supply port or the third supply port, the shuttle 248 will unseat and move into sealing engagement with the metal valve seat 246 of the body 202. This will allow fluid to flow from the second supply port 238 through the zig-zagged passageways 226 and 227 and out the function port 260 to the BOP, not shown. If, in the alternative, fluid pressure in the third supply port 250 is greater than fluid pressure in the first supply port 236 or the second supply port 238, then the shuttle 260 will disengage from the metal valve seat 256 and engage the metal valve seat 258 of the body 204. This allows fluid to flow from the third supply port directly to the function port 260 and the BOP. The shuttle 248 progressively coins the metal valve seats 244 and 246 in similar fashion as the shuttle 120 described in FIGS. 3–10. Likewise, the shuttle 260 progressively coins the metal valve seats 256 and 258.

Figure 12:
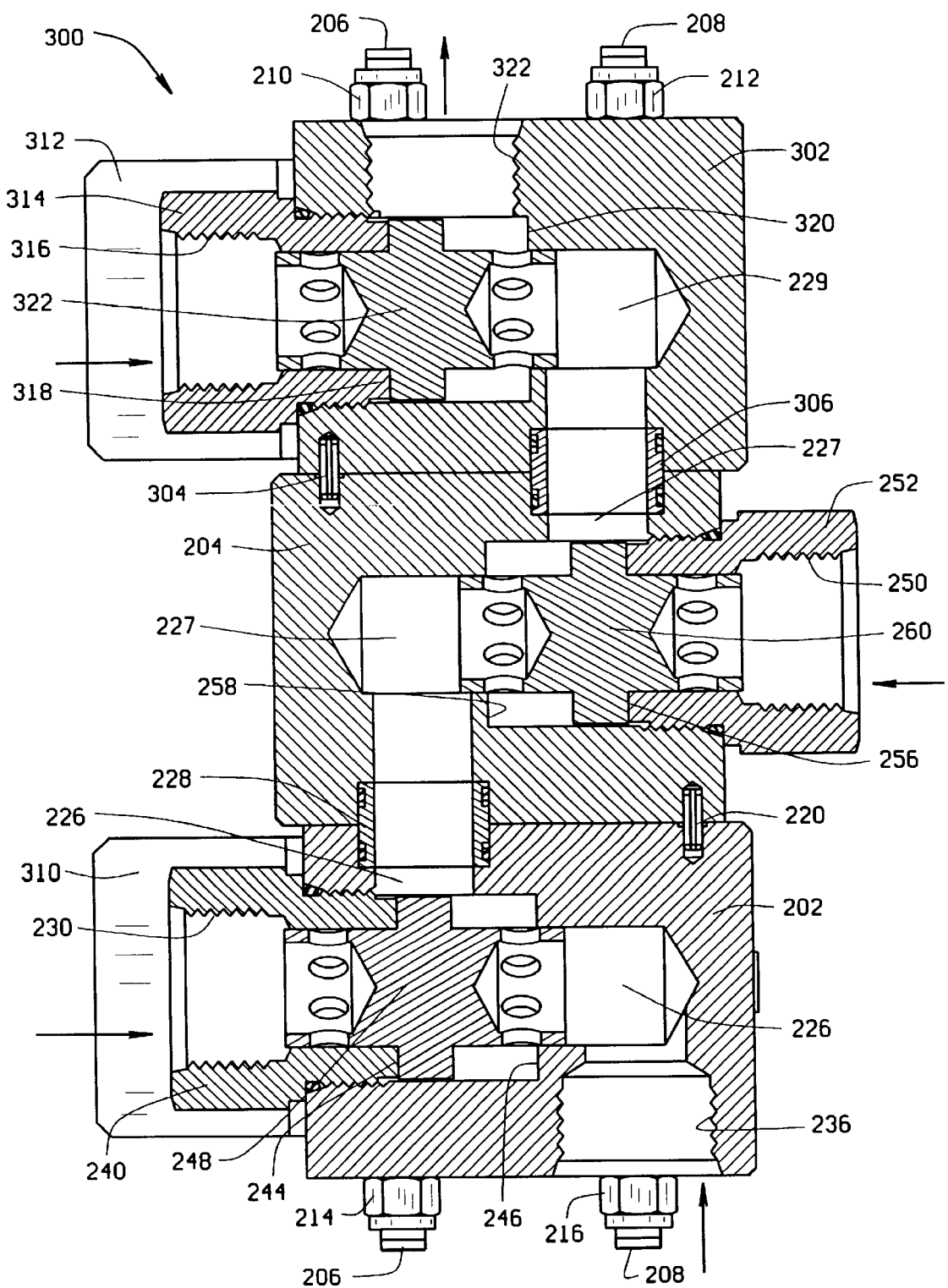
FIG. 12 is an alternative embodiment of the present invention with four supply ports.

FIG. 12 is an alternative embodiment with a four supply design for a low interflow hydraulic shuttle valve 300. The design in FIG. 12 is identical to the three supply valve 200 shown in FIG. 11 except another supply port and another body section have been added. The four supply valve 300 includes a first body section 202, a second body section 204 and a third body section 302. The body sections are aligned and connected by the first alignment pin 220 and a second alignment pin 304. Zig-zagged passageways 226, 227 and 229 are formed in the respective bodies 202, 204 and 302 and are interconnected and sealed against the bodies via a first connector 228 and a second connector 306. The second connector 306 is identical to the connector 228 shown and described in FIG. 11 except connector 228 joins body sections 202 and 204 and connector 306 joins body sections 204 and 302. The respective body sections 202, 204 and 302 are connected by a plurality of nuts 210, 212, 214 and 216 and bolts 206 and 208. The valve 300 is mounted via brackets 310 and 312 to a BOP, not shown. Brackets 310 and 312 are used to mount the valve 300.

The body section 202 includes a first supply port 236 and a second supply port 238 formed in the adapter 240. The adapter defines a first metal valve seat 244 and the body 202 defines a coaxial second metal valve seat 246. The shuttle 248 moves from alternative sealing engagement with the first metal valve seat 244 to the second metal valve seat 246 in response to differential fluid pressures in the first supply port 236 or the second supply port 238.

The second adapter 252 defines another metal valve seat 256 and the body portion 204 defines an opposing coaxial metal valve seat 258. The shuttle 260 moves back and forth into alternative sealing engagement with the metal valve seat 256 or the metal valve seat 258 depending on differential fluid pressures exerted upon the shuttle 260. A third adapter 314 defines a fourth supply port 316 and another metal valve seat 318. An opposing coaxial metal valve seat 320 is formed in the body section 302. A third shuttle 322 moves into alternative sealing engagement with the metal valve seat 318 of the adapter 314 or the metal valve seat 320 of the body 302 depending on differential fluid pressures.

FIG. 12 shows the valve 300 with the highest pressure in the first supply port 236 which a) urges the shuttle 246 into sealing engagement with the metal valve seat 244 of the second supply port 238, b) urges the shuttle 260 into sealing engagement with the metal valve seat 256 of the third supply port 250, and c) urges the shuttle 322 into sealing engagement with the metal valve seat 318 of the fourth-supply port 316. This allows hydraulic fluid to pass from the first supply port 236 through the zig-zagged passageways 226, 227 and 229 of the body portions 202, 204 and 302 into the function port 322 and thereafter to the BOP, not shown.

In the alternative, a higher differential pressure in the second supply port 238 will cause the shuttle 248 to move into sealing engagement with the metal valve seat 246 thereby allowing fluid to pass from the second supply port 238 through the zig-zagged passageways 226, 227 and 229 to the function port 322 and into the BOP, not shown. Higher differential pressures in the third supply port 250 will likewise cause the shuttle 260 to move and engage the metal valve seat 258 and allow fluid to pass from the third supply port 250 through the passageways 226, 227 and 229 into the function port 322 and out to the BOP, not shown. If the highest fluid pressure occurs in the four supply port 312, the shuttle 322 will move into sealing engagement with the metal valve seat 320, thus allowing fluid to flow from the fourth supply port 316 into the function port 322 and thereafter to the BOP, not shown.

Using the modular body approach, as shown in FIGS. 11 and 12, it is possible to create low interflow hydraulic shuttle valves with as many supply ports as needed depending on the specific application.

FIG. 13 is a section view of a prior art flow biased shuttle valve sold by Gilmore Valve Company, generally identified by the numeral 399. The shuttle 121 is in the right-hand position sealing off fluid flow from the remote operated vehicle (ROV) supply port 113. The ROV supply port 113 is connected by a hose (not shown) to an ROV docking station. In emergencies or during testing, an ROV may be maneuvered by topside personnel to engage the ROV docking station. Fluid is then injected by the ROV through the fluid line into the ROV supply port 113. When this occurs, the shuttle 121 moves into the left-hand position, not shown in the drawing, thus allowing the hydraulic fluid to pass from the ROV through valve 399 to the BOPs.

The shuttle valve 399 includes a body 102 which is supported by a bracket, not shown. The valve 399 includes a first adapter 106 and a second adapter, sometimes referred to as the ROV adapter, 402. The first adapter 106 and the ROV adapter 402 are coaxially aligned on opposite sides of the body 102. The first adapter 106 forms an inlet or supply port 110 and the ROV adapter 402 forms a second inlet or supply port sometimes referred to as the ROV supply port, 113. The supply port 110 is connected to a hose or piping, not shown in the drawings, which connects to a pressurized fluid source. The ROV supply port 113 connects via a hose or piping, not shown in the drawings, to an ROV docking station, not shown in the drawings.

The body 102 forms a transverse outlet or function port 114. The function port 114 is connected to a hose or piping, not shown in the drawings. Fluid enters the valve 399 either through the first supply port 110 or the ROV supply port 113 and exits the valve 399 through the function port 114. When fluid leaves the function port 114 it goes to the BOPs.

In FIG. 13, fluid can flow from the first supply port 110 through a passageway 111 in the body 102 and out the function port 114. The first adapter 106 threadibly engages an aperture 122 in the body 102. An o-ring 124 seals the adapter 106 to the body 102. The ROV adapter 402 threadibly engages an aperture 128 in the body 102. An o-ring 130 seals the ROV adapter 402 to the body 102.

The adapter 106 has a metal valve seat 132 and the ROV adapter 402 has an opposing coaxially metal valve seat 129. The shuttle 121 includes a centrally located circumferential flange 136 which has opposing sealing services 139 and 141. As shown in FIG. 13, sealing surface 141 is in sealing engagement with the metal valve seat 129 on the ROV adapter 402, blocking any fluid flow from the ROV supply port 113.

The flow biased shuttle assembly generally identified by the numeral 400 in this prior art device, has a number of components including the elongate tubular ROV adapter 402, piston rod 404 with a head 406 on one end and a threaded point 408 on the other end which threadibly engage an aperture 409 in the shuttle 121 and a spring 410. A central bore 401 in the ROV adapter 402 allows fluid to move from the ROV supply port 113, through the central bore 401 and into the passageway 111 of the valve 399 when the shuttle 121 disengages from the valve seat 129 on the ROV adapter 402. When the piston rod 402 moves axially, the shuttle, 121 likewise moves axially. A spring 410 surrounds the piston rod 404 and is captured between the head 406 and the end 407 of the shuttle 121.

When fluid is injected by the ROV into the ROV supply port 113, the shuttle 121 moves from the position shown in the drawing to engagement with the valve seat 132. This causes compression of the spring 410. When the fluid flow subsides, the compressed spring 410 exerts forces on the head 406 which is translated through the piston rod 404 to the shuttle 121 causing it to move from engagement with the valve seat 132 back to engagement with the valve seat 129, as shown in FIG. 13.

The shuttle 121 has a first end portion or cage 142 that includes a central bore 46 with a total of six apertures, 148, 150, 152, 156 and two others not shown. The other end portion or cage 158 includes a bore 160 that is coaxially with the bore 146 and a total of six apertures, 162, 164, 166, 168 and two others not shown. When fluid flows from the inlet port 110, it moves through the bore 146 and the apertures 148, 150, 152, 156 and then into the passageway 111. From the passageway 111, it exits the function port 114. When the shuttle moves into the opposite position, fluid flows from the ROV support port 113 through the central bore 401, through the bore 160 and out the apertures 162, 164, 166, 168 and two others not shown. The fluid then flows into the passageway 111 and out the function port 114. This prior art device 399 had certain limitations because it was actuated by flow only. If an ROV did not generate sufficient flow rates, the apparatus would not always function properly. In order to make sure that the biased shuttle valve would function with all different types of ROVs, the design was changed so that it would function based on pressure and not flow.

FIG. 14 is a section view of the pressure biased shuttle valve generally identified by the numeral 499. In this view, the shuttle is in the right-hand position allowing fluid to flow as indicated by the flow arrows. The pressure biased shuttle assembly is generally identified by the numeral 500.

The pressure biased shuttle valve 499 includes a body 102 which is supported by a bracket 104. The valve 499 includes a first adapter 106 and a second ROV adapter 501, coaxially aligned on opposite sides of the body 102. The first adapter 106 forms an inlet or supply port 110 and the second adapter, generally referred to as the ROV adapter 501, forms an inlet or supply port 113, also referred to as the ROV supply port. Each supply port 110 and 113 is connected to a separate hose or piping, not shown in the drawings. The ROV supply port 113 is connected to an ROV docking station and receives hydraulic fluid from the ROV, as previously discussed. The inlet port 110 is connected to a different pressurized fluid source, not shown. The body 102 forms a transverse outlet or function port 114. The function port 114 is connected to a hose or piping, not shown in the drawings. The function port 114 connects to the BOPs. Fluid enters the valve 499 either through the first supply port 110 or the ROV supply port 113 and exits the valve 499 through the function port 114.

The first adapter 106 threadibly engages an aperture 122 in the body 102. An o-ring 124 seals the adapter 106 to the body 102. The ROV adapter 501 threadibly engages an aperture 128 in the body 102. An o-ring 130 seals the adapter 501 to the body 102. The adapter 106 includes a metal valve seat 132 and the ROV adapter 501 includes an opposing coaxially metal valve seat 133. The shuttle 119 includes a centrally located circumferential flange 136 which has opposing tapered sealing services 138 and 140. As shown in this drawing, the sealing surface 140 is in sealing engagement with the metal valve seat 133 blocking any fluid flow from the ROV supply port 113.

The shuttle 119 has a first end portion or cage 142 that includes a central bore 146 and a total of six apertures 148, 150, 152, 156 and two others not shown. The other end portion or cage 158 includes a bore 160 that is coaxially with the bore 146 and a total of six apertures 162, 164, 166, 168 and two others not shown. In FIG. 14, the shuttle 119 is in the right-hand position in sealing engagement with the metal valve seat 133 of the ROV adapter 501. This allows fluid to flow from the first supply port 110 through the bore 146 and the apertures 148, 150, 152 and 156 through the passageway 111 of the valve 100 to the function port 114, as shown by the flow arrows in the drawing.

The pressure biased shuttle assembly is generally identified by the numeral 500. It includes an ROV supply port 113 on one end and a metal valve seat 133 on the other end. A central bore 503 is formed on the longitudinal axis of the ROV adapter 501 and allows fluid communication from the ROV supply port 113 past the metal valve seat 133.

A piston rod 502 is formed with a head, 506 on one end and a threaded point 508 on the other end. The threaded point 508 threadibly engages a similarly threaded receptacle 507 formed in the shuttle 199. Adjacent to the threaded end 508 of the piston rod 502 is a radial flange 509. The radial flange abuts a shoulder 511 formed in the shuttle 119. A spring 510 surrounds the piston rod 502. A piston 512 is positioned inside the central bore 502 of the ROV adapter 501. An o-ring channel 513 is formed in the outer circumference of the piston 502 and receives an o-ring 514. The o-ring 514 provides a seal between the piston 510 and the inside diameter of the bore 503. The spring 510 is captured between the back side of the piston 512 and a shoulder 515 formed in the ROV adapter 501. In order to function in response to pressure rather than in response to fluid flow, the outside diameter of the piston 512 must be larger than the outside diameter of the shuttle 119 as measured between the points A and B on the circumferential flange 136. For example, in the present invention for a one-inch valve, the outside diameter of the shuttle 119 as measured between the points A and B on the circumferential flange 136 is nominally 1⅜ inches and the outside diameter of the piston 512 is nominally 1½ inches. This larger diameter on the piston 512 insures that pressure from the ROV supply port 113 exerted upon the piston 512 will cause the shuttle to open against the spring force of spring 510.

Applicants have determined that a spring 510 with a spring rate of 85 lb./inch is suitable for a ½ in size pressure biased shuttle valve and a spring 510 with a spring rate of 175 lb./inch is suitable for a 1 inch size pressure biased shuttle valve. Springs with different spring rates may also be suitable depending on the size and configuration of a particular valve.

A frustro-conical valve surface 507 is formed on the backside of the head 506 of the piston rod 502. A valve seat 513 is formed in a depression in the piston 512. A metal-to-metal seal is achieved between the valve 507 and the seat 513, as better shown in FIGS. 17 and 18. The piston 512 has a central aperture 522 through which fluid flows when the valve 507 is disengaged from the seat 513, as better seen in FIG. 16. In FIG. 14, the valve 502 and the seat 513 are engaged and there is no flow from the ROV supply port 113 to the function port 114.

FIG. 15 is a section view of the pressure biased shuttle valve 499 like FIG. 14, except the ROV has injected fluid into the ROV port 113 causing the shuttle 119 to move from the right-hand position to the left-hand position into sealing engagement with the metal valve seat 132 on the adapter 106. This pressurized fluid exerts a force across the entire diameter of the piston 512 and the head 506 of the piston rod 502. As shown in FIG. 15, the valve 507 is in sealing engagement with the seat 513 so that no fluid can pass through the aperture 522. The force being exerted upon the piston 512 and the head 506 is transferred through the piston rod 502 to the shuttle 119 causing it to move from the right-hand position of FIG. 14 into the left-hand position shown in FIG. 15. There is no flow through the function port 114 when the valve is in the position shown in FIG. 15.

FIG. 16 is a section view of the pressure biased shuttle valve 499 of FIG. 14, except the valve has now opened and fluid can flow from the ROV supply port 113 around the head 506 through the annular passageway 522, through the bore 503, through the bore 160 and through the apertures 162, 164, 166, 168 and two others not shown, into the passageway 111 and out the function port 114, as shown by the flow arrows in the drawings.

In FIG. 16, the valve 507 has disengaged from the seat 513 and the tapered sealing service 140 has disengaged from the metal valve seat 133, again allowing fluid to flow as indicated by the flow arrows from the ROV supply port 113 through the pressure biased shuffle assembly 500 through the valve 499 and out the function port 114. This fluid flow only occurs during emergencies to shut down the well or during tests of such emergency equipment.

Figure 17:
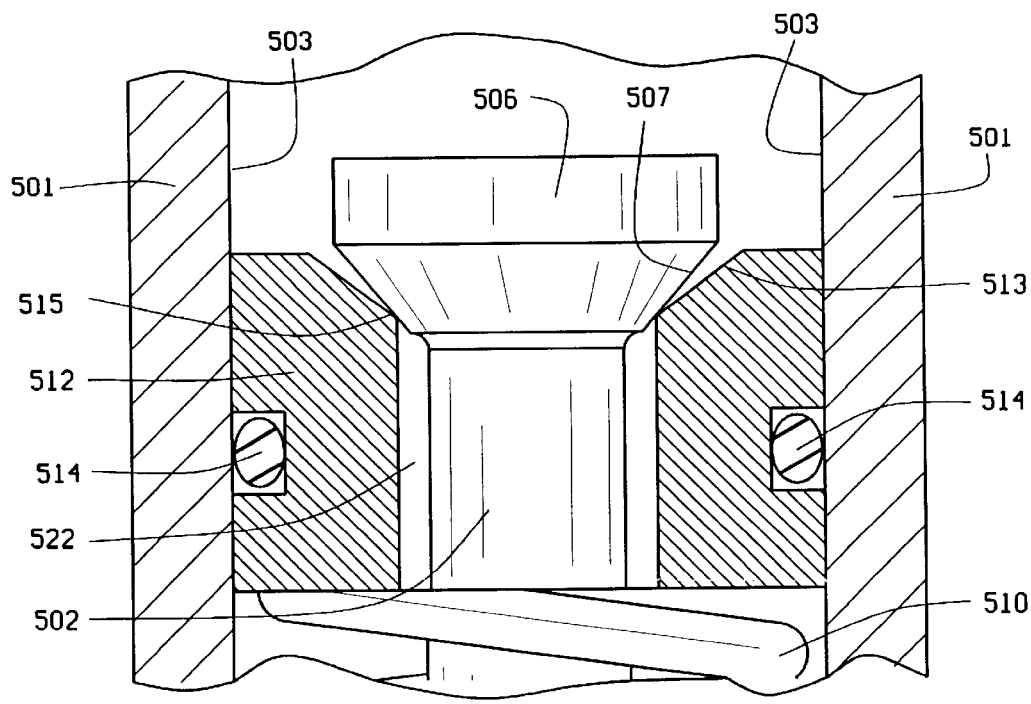
FIG. 17 is an enlarged section view of the piston rod head and piston before any coining has occurred.

FIG. 17 is an enlarged section view of a portion of the pressure biased shuttle assembly 500 showing the piston rod head 506 before any coining has occurred between the valve 507 and the seat 513. The angle of the frustro-conical valve 507 is mismatched when compared with the angle of the seat 513. The seat 513 forms a point 515 which contacts the frustro-conical valve 507. FIG. 17 is a drawing of a portion of the pressure biased shuttle valve 499 after manufacture, but before any testing or operation of the valve. After the pressure biased shuttle valve 499 has been tested and/or actuated, coining or displacement of metal at the point 515 occurs, as shown in the next figure.

Figure 18:
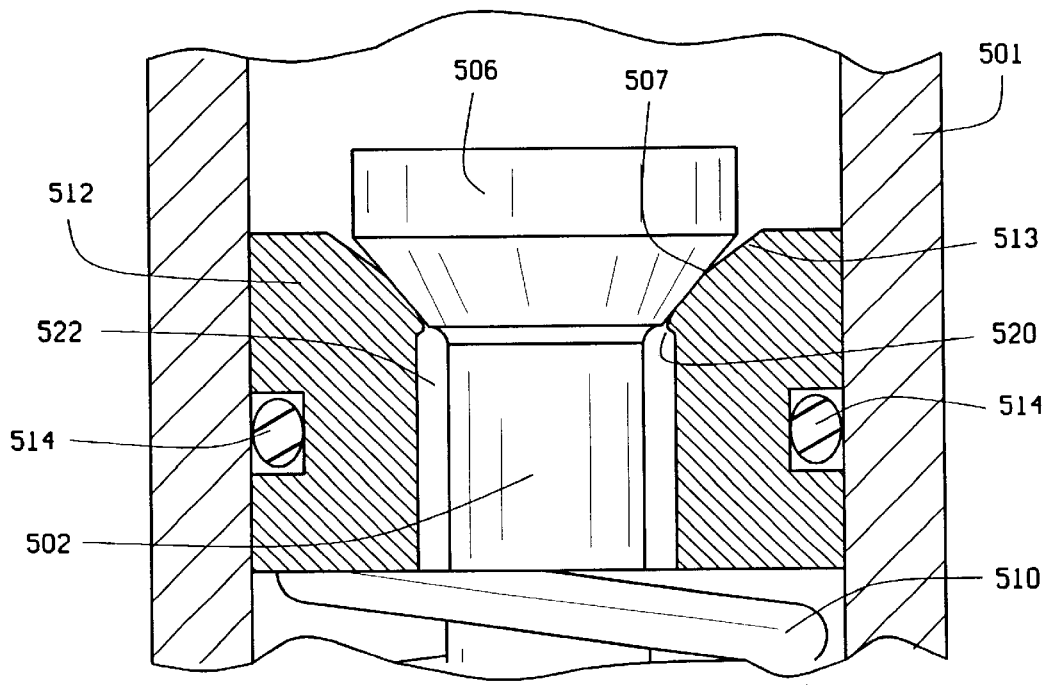
FIG. 18 is an enlarged section view of the piston rod head and piston after coining has occurred and sealing engagement has been established.

FIG. 18 is an enlarged section view of a portion of the pressure biased shuttle valve assembly 500, after coining has occurred and sealing engagement has been established between the frustro-conical valve 507 and the seat 513. After the head 506 has been stroked axially several times, the metal in the point 515 is progressively coined and/or displaced at 520. This displacement of the metal on the seat 513 creates a metal-to-metal seal between the seat 513 and the frustro-conical valve 507. As the shuttle 119 moves axially, the piston rod 502 likewise moves axially, causing the head 506 to contact the piston 512. This causes the frustro-conical valve 507 to contact the seat 513 at the point 515 to continually refresh the metal-to-metal seal between the head 506 and the piston 512. A seal is likewise established between the o-ring 514 and the inside diameter of the passageway 503 of the ROV adapter 501.

Figure 19:
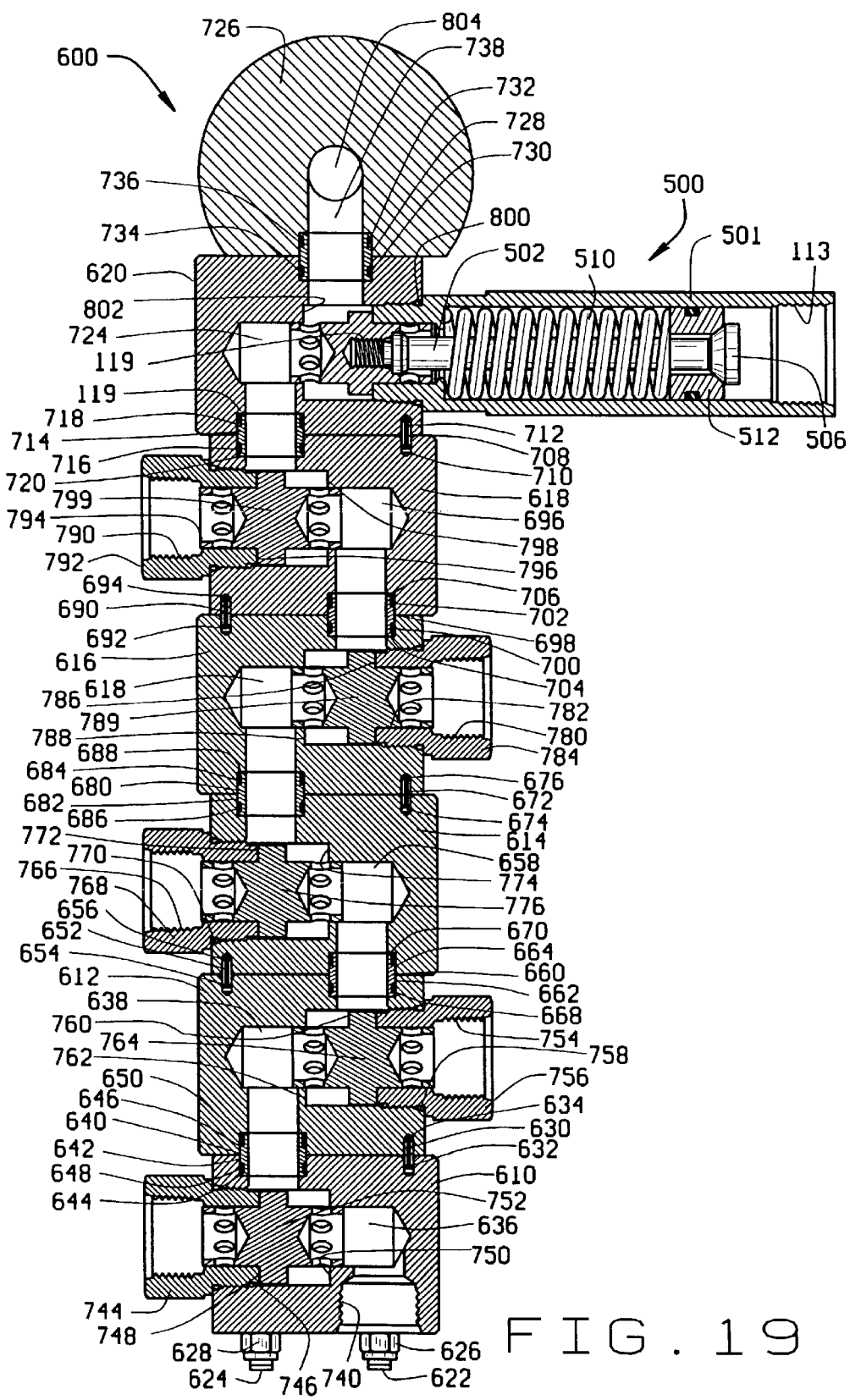
FIG. 19 is a section view of the pressure biased shuttle valve installed in a valve with seven supply ports.

FIG. 19 is a section view of an alternative embodiment of the pressure biased shuttle valve 600 with seven supply ports. (The embodiment shown in FIGS. 14–18 has two supply ports.)

The pressure biased shuttle valve 600 includes a first body portion 610, a second body portion 612, a third body portion 614, a fourth body portion 616, a fifth body portion 618 and a sixth body portion 620. The body portions 610, 612, 614, 616, 618 and 620 are held together by a plurality of bolts 622 and 624 and a plurality of nuts 626 and 628, that mechanically grip the six body sections, thus joining them together into an integral assembly.

An alignment pin 630 fits into a bore 632 of the body 610 and a coaxial bore 634 of the body 612. A zig-zag interconnecting passageway 636 is formed in the body 610 and is in fluent communication with a second zig-zag passageway 638 in the body 612. A connector 640 is positioned in a bore 642 of the body 610 and another coaxial bore 646 in the body 612. The connector 640 has a first seal 644 and a second seal 650 to prevent fluid from leaking from the zig-zag passageways 636 and 638. The connector 640 also helps align the body portions 610 and 612.

An alignment pin 652 fits into a bore 654 of the body 612 and a coaxial bore 656 of the body 614. A zig-zag interconnecting passageway 658 is formed in the body 614 and is in fluid communication with the zig-zag passageways 636 and 638. A connector 660 is positioned in a bore 662 of the body 612 and another coaxial bore 664 in the body 614. The connector 660 has a first seal 668 and a second seal 670 to prevent fluid from leaking from the zig-zag passageways 638 and 658. The connector 660 also helps align the body portions 612 and 614.

An alignment pin 672 fits in a bore 674 of the body 614 and a coaxial bore 676 of the body 616. A zig-zag interconnecting passageway 678 is formed in the body 616 and is in fluid communication with the other zig-zag passageways, 658, 638 and 636. A connector 680 is positioned in a bore 682 of the body 614 and another coaxial bore 684 of the body 616. The connector 680 has a first seal 686 and a second seal 688 to prevent fluid from leaking from the zig-zag passageways 678 and 658. The connector 680 also helps align the body portions of 614 and 616.

An alignment pin 690 fits into a bore 692 of the body 616 and a coaxial bore 694 of the body 618. A zig-zag interconnecting passageway 696 is formed in the body 618 and is in fluid communication with the other zig-zag passageways 678, 658, 638 and 636.

A connector 698 is positioned in a bore 700 of the body 616 and another coaxial bore 702 in the body 618. The connector 698 has a first seal 704 and a second seal 706 to prevent fluid from leaking from the zig-zag passageways 698 and 678. The connector 698 also helps align the body portions 618 and 616.

An alignment pin 708 fits into a bore 710 of the body 618 and a coaxial bore 712 of the body 620. A zig-zag interconnecting passageway 724 is formed in the body 620 and is in fluid communication with the other zig-zag passageways 696, 678, 658, 638 and 636. A connector 714 is positioned in a bore 716 of the body 620 and another coaxial bore of 718 in the body 620. The connector 714 has a first seal 720 and a second seal 722 to prevent fluid from leaking from the zig-zag passageways 724 and 696. The connector 714 also helps align the body portions 620 and 618.

A connector 728 is positioned in a bore 730 of the body 620 and another coaxial bore 732 in the whatchamacallit 726. The connector 728 has a first seal 734 and a second seal 736 to prevent fluid from leaking from the passageways 738 and 724. The connector 728 also helps align the body portion 620 and the whatchamacallit 726 (Harold help me). The pressure biased shuttle assembly 500 is the same shuttle assembly shown in FIGS. 14–18.

A first supply port 740 is formed in the body 610 and is fluid communication with the passageway 636. A second supply port 742 is formed in a first adapter 744. The adapter 744 threadibly engages the body 610. The adapter 744 is sealed against the body 610 by an o-ring 746. The metal valve seat 748 is formed on one end of the adapter 744. A second metal valve seat 750 is formed in the body 610 and is coaxially with the valve seat 748. A shuttle 752 moves from sealing engagement with the metal valve seat 748 of the adapter 744, as shown in the drawing, to alternative sealing engagement with the valve seat 740 of the body 610. A third supply port 754 is formed in a third adapter 756. The adapter 756 threadibly engages the body 612. The adapter 756 is sealed against the body 612 by an o-ring 758. A metal valve seat 760 is formed on one end of the adapter 756. An opposing metal valve seat 762 is formed in the body 612 and is coaxial with the valve seat 760. A shuttle 764 moves from sealing engagement with the valve seat 760 of the adapter 756, as shown in the drawing, to alternative sealing engagement with the valve seat 762 of the body 612.

A third supply port 766 is formed in a third adapter 768. The adapter 768 threadibly engages the body 614. The adapter 768 is sealed against the body 614 by an o-ring 770. A metal valve seat 772 is formed on one end of the adapter 768. A second metal valve seat 774 is formed in the body 612 and is coaxial with the valve seat 772. A shuttle 776 moves from sealing engagement with the metal valve seat 772 of the adapter 768, as shown in the drawing, to alternative sealing engagement with the valve seat 774 of the body 614.

A fourth supply port 780 is formed in a fourth adapter 784. The adapter 784 threadibly engages the body 616. The adapter 784 is sealed against the body 616 by an o-ring 782. A metal valve seat 786 is formed on one end of the adapter 784. A second metal valve seat 788 is formed in the body 616 and is coaxial with the valve seat 786. A shuttle 789 moves from sealing engagement with the metal valve seat 786 of the adapter 784, as shown in the drawing, to alternative sealing engagement with the metal valve seat 788 of the body 616.

A sixth supply port 790 is formed in the adapter 792. The adapter 792 threadibly engages the body 618. The adapter 792 is sealed against the body 618 by an o-ring 794. A metal valve seat 796 is formed on one end of the adapter 792. A second metal valve seat 798 is formed in the body 618 and is coaxial with the valve seat 796. A shuttle 799 moves from sealing engagement with the metal valve seat 796 of the adapter 792, as shown in the drawing, to alternative sealing engagement with the valve seat 798 of the body 618.

The ROV supply port 113 is formed in the ROV adapter 501. The ROV adapter 501 threadibly engages the body 620.

The ROV adapter 501 is sealed against the body 620 by an o-ring 800. A metal valve seat 133 is formed on one end of the ROV adapter 501. A second metal valve seat 802 is formed in the body 620 and is coaxial with the valve seat 133. A shuttle 119 moves from sealing engagement with the metal valve seat 133 of the ROV adapter 501, as shown in the drawing, to alternative sealing engagement with the metal valve seat 802 of the body 620.

A first supply line, not shown in the drawing, connects to the first supply port 740, the second supply line, not shown in the drawing, connects to the second supply port 754, a third supply line, not shown in the drawing, connects to a third supply port 766, a fourth supply line, not shown in the drawing, connects to a fourth supply port 780, a fifth supply line, not shown in the drawing, connects to a fifth supply port 790, and a seventh supply line, not shown in the drawing, connects to an ROV docking terminal and the ROV supply port 113. If pressure in the first supply port 740 is greater than the fluid pressure in the second supply port 742, the third supply port 754, the fourth supply port 766, the fifth supply port 780, the sixth supply port 790, and the ROV supply port 113, the shuttles 752, 764, 776, 789, 799 and 119 will be urged into sealing engagement with the respective valve seats 748, 764, 772, 786, 796 and 133, as shown in FIG. 19. This allows fluid to flow from the first supply port 740 through the zig-zag passageways 636, 638, 658, 618, 696, 742 and 738 and out the function port 804, to the VOP, not shown.

If fluid in the second supply port 742 is greater than fluid pressure in the first supply port 740, the second supply port 754, the third supply port 766, the fourth supply port 780, the fifth supply port 790, or the ROV supply port 113, then the shuttle 752 will unseat and move into sealing engagement with the metal valve seat 750 of the body 610. This will allow fluid to flow from the second supply port 742 through the zig-zag passageways 638, 658, 618, 696, 724 and 738 and out the function port 804 to the BOP, not shown. The other supply ports work in similar function. The supply port with the highest fluid pressure will open and the others will remain closed, allowing fluid from the highest supply port to move to the function port 804.

The shuttles 752, 764, 776, 789, and 799 progressively coin the respective opposing metal valve seats in similar fashion as the shuttle 120 described in FIGS. 3–10. Likewise, the shuttle 119 progressively coins the valve seats 133 and 124 to achieve a metal to metal seal.

FIG. 20 is a section view of the pressure biased shuttle assembly 500, which is sold as a repair kit for the pressure biased shuttle valve shown in FIGS. 14–19. The pressure biased shuttle valve assembly includes all of the components shown, including the elongate tubular ROV adapter 501, the piston rod 502, the piston 512, the shuttle 119 and the spring 510. From time to time, it is necessary to service the pressure biased shuttle valve which is normally located subsea. In order to service the valve, it and accompanying apparatus is brought to the surface. Time is therefore of the essence and anything that can be done to speed repair and replacement of the valves is desirable. The pressure biased shuttle valve assembly repair kit 500 can therefore be sold as a separate component and used on board during repair and maintenance.

FIG. 21 is a section view of an alternative embodiment of the pressure biased shuttle assembly and is generally identified by the numeral 850. The elongate tubular ROV adapter 501 includes an ROV supply port 113 on one end and a metal valve seat 133 on the other end. A central bore 503 is formed along the longitudinal axis of the ROV adapter 501. 133.

A piston rod 502 is formed with a head or valve, 506 on one end and an abutment 852 on the other end. The shuttle 121 has a first end portion or cage 142 that includes a central bore 146 and a total of 6 apertures, 148, 150, 152, 156 and two others not shown. The other end portion or cage 159 includes a bore 161 that is coaxial with the bore 146. The cage 159 has 6 apertures, not shown in the drawing, similar to the apertures in the opposing cage 146. In FIG. 21, the shuttle 121 is in the right-hand position and sealing engagement is achieved between the metal valve seat 133 of the ROV adapter 501 and the sealing surface 140. When the shuttle 121 disengages from the valve seat 133 fluid can flow from the ROV supply port 113 through the central bore 503 and past the metal valve seat 133.

Figure 22:
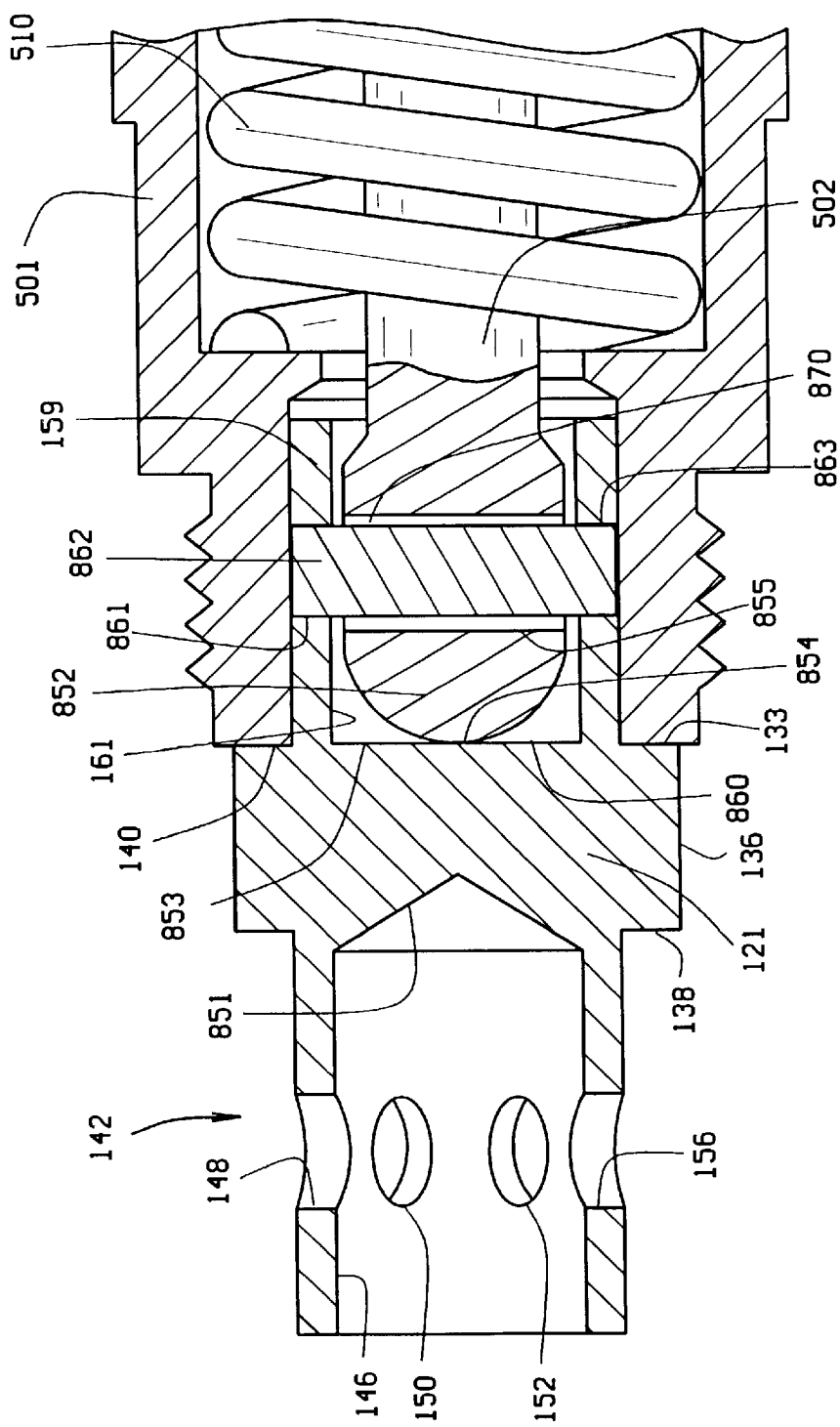
FIG. 22 is an enlarged section view showing a portion of the alternative embodiment of FIG. 21.

FIG. 22 is an enlarged section view of the shuttle 121 and a portion of the ROV adapter 501. An abutment 852 is formed on one end of the piston rod 502 opposite the valve 506. A transverse hole 855 is formed in the abutment 852. The tip 854 of the abutment 852 is rounded. However, other surfaces are within the scope of this invention such as a point or a frustro-conical projection.

A hole 861 and an opposing coaxial hole 863 are formed in the cage 159. The holes 861 and 863 are sized and arranged to receive the crosspin 862, which is pressed to fit into the holes 861 and 863. The outside diameter of the crosspin 862 is primarily a matter of manufacturing convenience. However there should be a gap 870 between the outside diameter of the crosspin 862 and the inside diameter of the hole 855 allowing some slop so that the shuttle 121 has some freedom of movement relative to the piston rod 502. In other words, there is a flexible connection between the shuttle 121 and the piston rod 502. This allows the sealing surfaces 138 and 140 on the circumferential flange 136 of the shuttle 121 to make a better seal with the metal valve seats 132 and 133.

In other words, the shuttle 121 has the ability to slightly pivot about the tip 854 of the piston rod 502 because of the slop 870 between the crosspin 862 and the hole 855. This flexible connection allows the shuttle 121 to find and make a better seal, especially in smaller size valves.

What is claimed is:

1. A valve to direct fluid flow from two different pressurized fluid sources through the valve to a downstream apparatus, the valve comprising:
   a body having a pair of opposing coaxial adapter ports, a transverse function port, and a passageway allowing fluid communication between all of the ports, each adapter port in fluid communication with one of the fluid sources and the function port in fluid communication with the downstream apparatus;
   an adapter threadibly engaging one of said adapter ports, the adapter having a first valve seat on one end and a inlet port on the other end, with a bore in between to permit fluid flow from the inlet port past the first valve seat;
   a pressure biased shuttle assembly including;
   i. an elongate tubular adapter engaging the other adapter port, the elongate tubular adapter having a second valve seat on one end and an inlet port on the other end with a central bore in between to permit fluid flow from the inlet port past the second valve seat;
   ii. an elongate shuttle coaxial with the first valve seat and the second valve seat, the shuttle slidably moving from alternative sealing engagement with the first valve seat to sealing engagement with the second valve seat;
   iii. a piston traveling in said elongate tubular adapter, the piston having a diameter larger than a diameter of said shuttle and the piston having a central aperture to allow fluid to flow from the inlet port on the elongate tubular adapter through the central bore in the elongate tubular adapter past the second valve seat;
   iv. an elongate piston rod passing through the central aperture in the piston, the rod connected on one end to said shuttle and having an enlarged valve on the other end, the enlarged valve engaging a valve seat on the piston to selectively block fluid flow through the central bore in the elongate tubular adapter; and
   v. a spring positioned in the elongate tubular adapter in contact with the piston and surrounding a portion of the piston rod, the spring selectively urging the piston and the valve seat into sealing engagement with the valve of the piston rod in response to fluid pressure in the inlet port of the elongate tubular adapter.

2. The apparatus of claim 1 wherein said enlarged valve is formed in a frustro-conical shape and the valve seat is formed on a frustro-conical depression in the piston, the frustro-conical valve adapted to contact the valve seat to progressively coin the valve seat and create a metal to metal seal between the valve and the valve seat.

3. The apparatus of claim 1 wherein the piston rod is rigidly connected to the shuttle by threads.

4. The apparatus of claim 1 wherein the piston rod is flexibly connected to the shuttle.

5. The apparatus of claim 4 wherein the piston rod has an abutment formed on the end opposite the valve, the abutment having an oversize transverse aperture that receives a crosspin to connect the piston rod to the shuttle.

6. A valve to direct fluid flow from a pressurized fluid source and a remote operated vehicle (ROV) through the valve to a blowout preventer (BOP) to actuate the BOP, the valve comprising:
   a body having an adapter port, an opposing coaxial ROV port, a transverse function port, and a passageway allowing fluid communication between all of the ports, the adapter port in fluid communication with the pressurized fluid source, the ROV port in fluid communication with the ROV and the function port in fluid communication with the BOP;
   an adapter threadibly engaging the adapter port, the adapter having a first valve seat on one end and a inlet port on the other end, with a bore in between to permit fluid flow from the inlet port past the first valve seat;
   a pressure biased shuttle assembly including;
   i. an elongate tubular adapter engaging the ROV port, the elongate tubular adapter having a second valve seat on one end and a inlet port on the other end with a central bore in between to permit fluid flow from the ROV port past the second valve seat;
   ii. an elongate shuttle coaxial with the first valve seat and the second valve seat, the shuttle slidably moving from alternative sealing engagement with the first valve seat to sealing engagement with the second valve seat;
   iii. a piston traveling in said elongate tubular adapter, the piston having a diameter larger than a diameter of said shuttle and the piston having a central aperture to allow fluid to flow from the ROV port through the central bore in the elongate tubular adapter past the second valve seat.
   iv. an elongate piston rod passing through the central aperture in the piston, the rod connected on one end to said shuttle and having an frustro-conical valve on the other end, the frustro-conical valve engaging a valve seat on the piston to selectively block fluid flow through the central bore in the elongate tubular adapter; and v. a spring positioned in the elongate tubular adapter in contact with the piston and surrounding a portion of the piston rod, the spring selectively urging the piston and the valve seat into sealing engagement with the valve of the piston rod in response to fluid pressure in the inlet port of the elongate tubular adapter.

7. The apparatus of claim 6 wherein the valve seat on the piston is formed in a frustro-conical depression and the angle of the depression is mismatched from the angle of the frustro-conical valve on the piston rod.

8. The apparatus of claim 6 wherein the piston rod is rigidly connected to the shuttle by threads.

9. The apparatus of claim 6 wherein the piston rod is flexibly connected to the shuttle.

10. The apparatus of claim 9 wherein the piston rod has an abutment formed on the end opposite the valve, the abutment having an oversize transverse aperture that receives a crosspin to connect the piston rod to the shuttle.

11. A valve to direct fluid flow from a plurality of different pressurized fluid sources to a downstream apparatus, the valve comprising:

a body having a first port, a plurality of adapter ports, a supply port and a function port, the function port in fluid communication with the downstream apparatus, the inlet port, adapter ports and supply port each in fluid communication with a different fluid source;

an adapter threadibly engaging each of said adapter ports, each adapter having a valve seat on one end and an inlet port on the other end, with a bore in between to permit fluid flow from each inlet port past each valve seat;

a passageway in said body in fluid communication with the first port, each inlet port on the adapers, the supply port and the function port, allowing fluid to move from the fluid sources through said passageway, through the function port to the downstream apparatus;

a plurality of elongate shuttles, each one coaxial with an adapter port slidably moving from sealing engagement with the valve seat on the adapter to sealing engagement with an opposing valve seat in response to fluid flow from the different fluid sources;

a pressure biased shuttle assembly including:

i. an elongate tubular adapter engaging said supply port, the adapter having a valve seat on one end and a inlet port on the other end with a bore in between to permit fluid flow from the inlet port past the valve seat;

ii. an elongate shuttle coaxial with the central bore in the elongate tubular adapter, the shuttle slidably moving from sealing engagement with the valve seat at one end of the elongate tubular adapter to sealing engagement with an opposing coaxial valve seat in said body;

iii. a piston traveling in said elongate tubular adapter, the piston having a diameter larger than a diameter of said shuttle and the piston having a central aperture to allow fluid to flow from the inlet port on the elongate tubular adapter through the central bore in the elongate tubular adapter past the valve seat;

iv. an elongate piston rod passing through the central aperture in the piston, the rod connected on one end to said shuttle and having an enlarged valve on the other end, the valve engaging a valve seat on the piston to selectively block fluid flow through the central bore in the elongate tubular adapter; and v. a spring positioned in the elongate adapter in contact with the piston and surrounding the piston rod, the spring urging the piston and the valve seat into selective sealing engagement with the valve of the piston rod in response to fluid pressure in the inlet port of the elongate tubular adapter.

12. The apparatus of claim 11 wherein said enlarged valve is formed in a frustro-conical shape and the valve seat is formed on a frustro-conical depression in the piston, the frustro-conical valve adapted to contact the valve seat to progressively coin the valve seat and create a metal to metal seal between the valve and the valve seat.

13. The apparatus of claim 11 wherein the piston rod is rigidly connected to the shuttle by threads.

14. The apparatus of claim 11 wherein the piston rod is flexibly connected to the shuttle.

15. The apparatus of claim 14 wherein the piston rod has an abutment formed on the end opposite the valve, the abutment having an oversize transverse aperture that receives a crosspin to connect the piston rod to the shuttle.

16. A valve to direct fluid flow from a plurality of different pressurized fluid sources and a remote operated vehicle (ROV) to a blowout preventer (BOP) to actuate the BOP, the valve comprising:

a body having a first port, a plurality of adapter ports, a ROV port and a function port, the function port in fluid communication with the BOP, the inlet port and adapter ports each in fluid communication with a different fluid source and the ROV port in fluid communication with the ROV;

an adapter threadibly engaging each of said adapter ports, each adapter having a valve seat on one end and an inlet port on the other end, with a bore in between to permit fluid flow from each inlet port past each valve seat;

a passageway in said body in fluid communication with the first port, each inlet port on the adapers, and the ROV port, allowing fluid to alternatively move from the fluid sources and the ROV through said passageway, and the function port to the BOP;

a plurality of elongate shuttles, each one coaxial with an adapter port slidably moving from sealing engagement with the valve seat on the adapter to sealing engagement with an opposing valve seat in the body in response to fluid flow from the different fluid sources;

a pressure biased shuttle assembly including:

i. an elongate tubular adapter engaging said ROV port, the adapter having a valve seat on one end and a inlet port on the other end with a bore in between to permit fluid flow from the ROV past the valve seat;

ii. an elongate shuttle coaxial with the central bore in the elongate tubular adapter, the shuttle slidably moving from alternative sealing engagement with the valve seat at one end of the elongate tubular adapter to sealing engagement with an opposing valve seat in said body;

iii. a piston traveling in said elongate tubular adapter, the piston having a diameter larger than a diameter of said shuttle and the piston having a central aperture to allow fluid to flow from the ROV port through the central bore in the elongate tubular adapter past the valve seat on the tubular adapter;

iv. an elongate piston rod passing through the central aperture in the piston, the rod connected on one end to said shuttle and having a frustro-conical valve on the other end, the valve engaging a complementary frustro-conical valve seat on the piston to selectively block fluid flow through the central bore in the elongate tubular adapter; and v. a spring positioned in the elongate adapter in contact with the piston and surrounding the piston rod, the spring urging the piston and the valve seat into sealing engagement with the valve of the piston rod in response to fluid pressure in the inlet port of the elongate tubular adapter.

17. The apparatus of claim 16, wherein the valve seat on the piston is formed in a frustro-conical depression and the angle of the depression is mismatched from the angle of the frustro-conical valve on the piston rod.

18. The apparatus of claim 16 wherein, each of said shuttles includes a central flange with opposing sealing surfaces having opposing outward tapers to engage the valve seats, the shuttles further including opposing end portions, each with an axial bore and a plurality of perforations through the end portion to the bore; and each of the opposing outward tapers of the sealing surfaces on the central flange of the shuttles is adapted to alternately contact the metal valve seats to progressively coin the valve seats and ensure a metal to metal seal between the tapers and the valve seats.

19. The apparatus of claim 16 wherein the piston rod is rigidly connected to the shuttle by threads.

20. The apparatus of claim 16 wherein the piston rod if flexibly connected to the shuttle.

21. The apparatus of claim 20 wherein the piston rod has an abutment formed on the end opposite the valve, the abutment having an oversize transverse aperture that receives a crosspin to connect the piston rod to the shuttle.

22. A valve repair kit comprising:

a pressure biased shuttle assembly including;
i. an elongate tubular adapter having a valve seat on one end and a inlet port on the other end with a central bore in between to permit fluid flow from the inlet port past the valve seat;
ii. an elongate shuttle coaxial with the inlet port, the shuttle slidably moving into engagement with the valve seat;
iii. a piston traveling in said elongate tubular adapter, the piston having a diameter larger than a diameter of said shuttle and the piston having a central aperture to allow fluid to flow from the inlet port on the elongate tubular adapter through the central bore in the elongate tubular adapter past the valve seat;
iv. an elongate piston rod passing through the central aperture in the piston, the rod connected on one end to said shuttle and having an enlarged valve on the other end, the valve engaging a valve seat on the piston to selectively block fluid flow through the central bore in the elongate tubular adapter; and
v. a spring positioned in the elongate tubular adapter in contact with the piston and surrounding a portion of the piston rod, the spring selectively urging the piston into sealing engagement with the valve of the piston rod in response to fluid pressure in the inlet port of the elongate tubular adapter.

23. A valve to direct fluid flow from two different pressurized fluid sources through the valve to a downstream apparatus, the valve comprising:

a body having a pair of opposing coaxial adapter ports, a transverse function port, and a passageway allowing fluid communication between all of the ports, each adapter port in fluid communication with one of the fluid sources and the function port in fluid communication with the downstream apparatus;

an adapter threadibly engaging one of said adapter ports, the adapter having a first valve seat on one end and a inlet port on the other end, with a bore in between to permit fluid flow from the inlet port past the first valve seat;

a pressure biased shuttle assembly including;
i. an elongate tubular adapter engaging the other adapter port, the elongate tubular adapter having a second valve seat on one end and an inlet port on the other end with a central bore in between to permit fluid flow from the inlet port past the second valve seat;
ii. an elongate shuttle coaxial with the first valve seat and the second valve seat, the shuttle slidably moving from alternative sealing engagement with the first valve seat to sealing engagement with the second valve seat;
iii. a piston traveling in said elongate tubular adapter, the piston having a diameter larger than a diameter of said shuttle and the piston;
iv. an elongate piston and passing through the central aperture in the piston, the rod having an abutment on one end and a valve on the other end, the valve engaging a valve seat on the piston to selectively block fluid flow through the central bore in the elongate tubular adapter; and
v. a spring positioned in the elongate tubular adapter in contact with the piston and surrounding a portion of the piston rod, the spring selectively urging the piston and the valve seat into sealing engagement with the valve of the piston rod in response to fluid pressure in the inlet port of the elongate tubular adapter; and
vi. the abutment having an oversize transverse aperture that receives a crosspin to achieve a flexible connection between the piston rod and the shuttle.

24. The apparatus of claim 23 wherein the abutment has a rounded terminus that pivots against the shuttle, to achieve a flexible connection between the piston rod and the shuttle.

* * * * *